Figure 1:
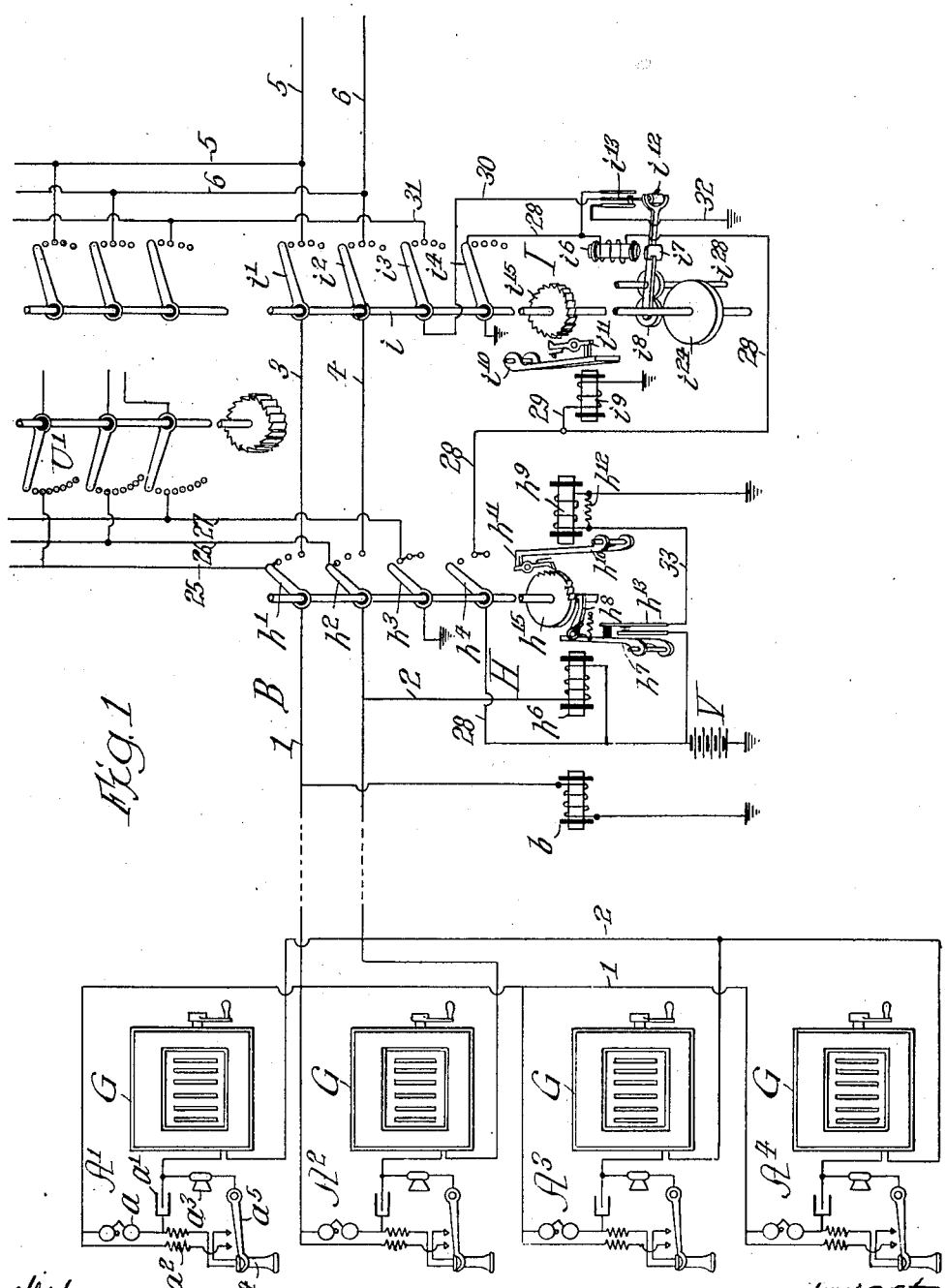
Figure 2:
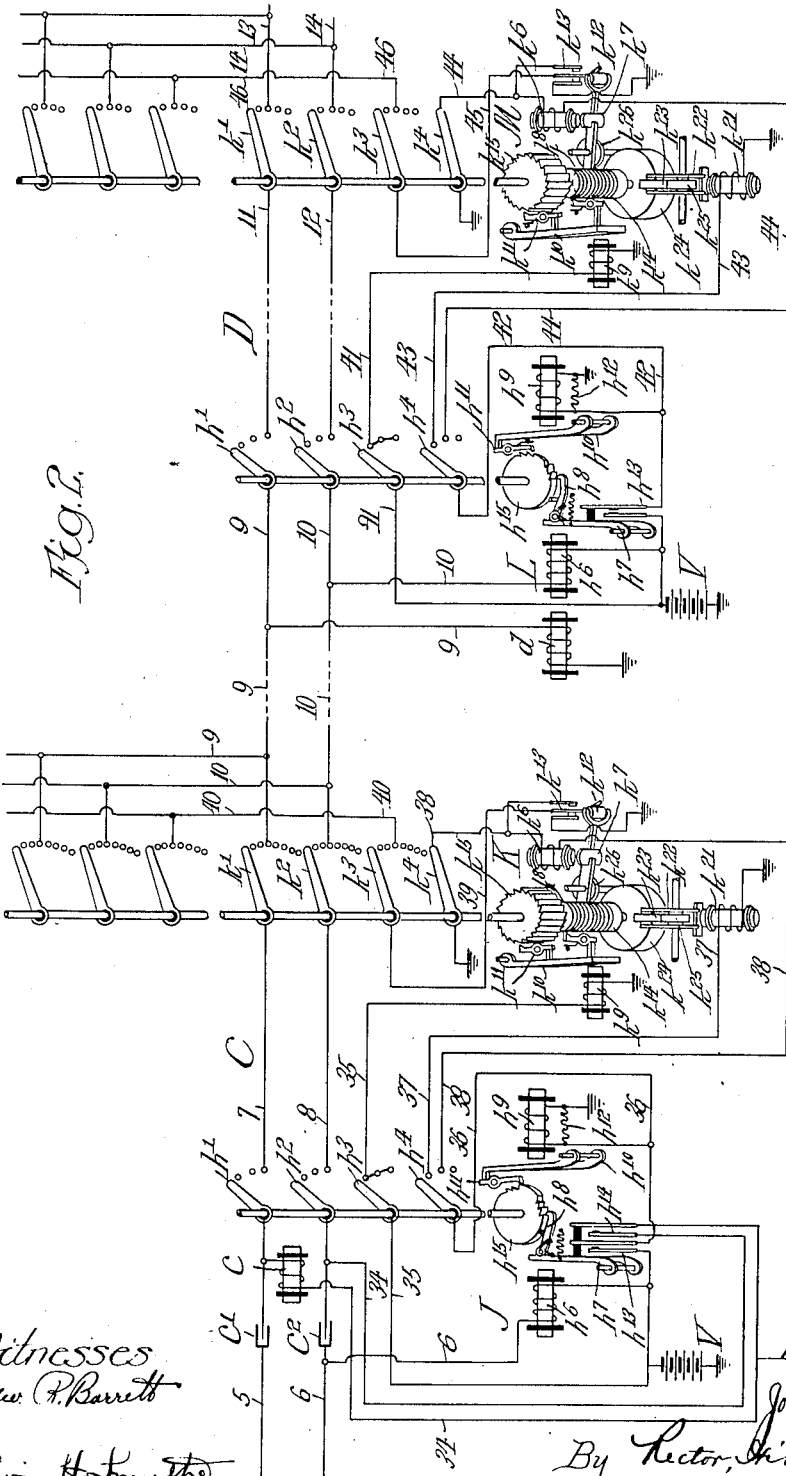
Figure 3:
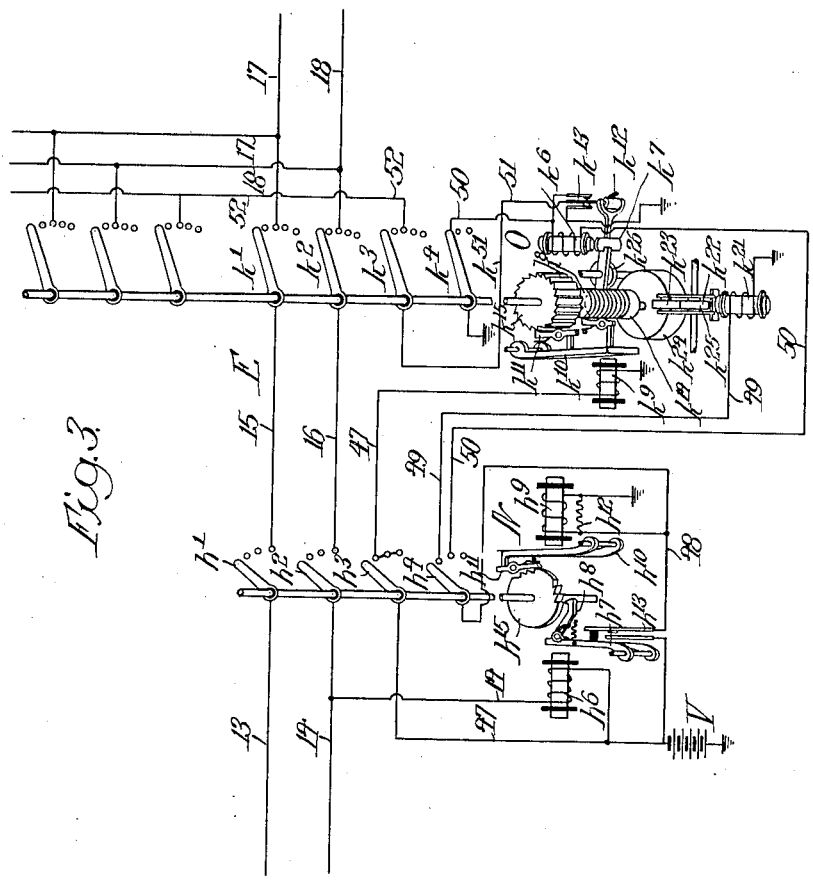
Figure 4:
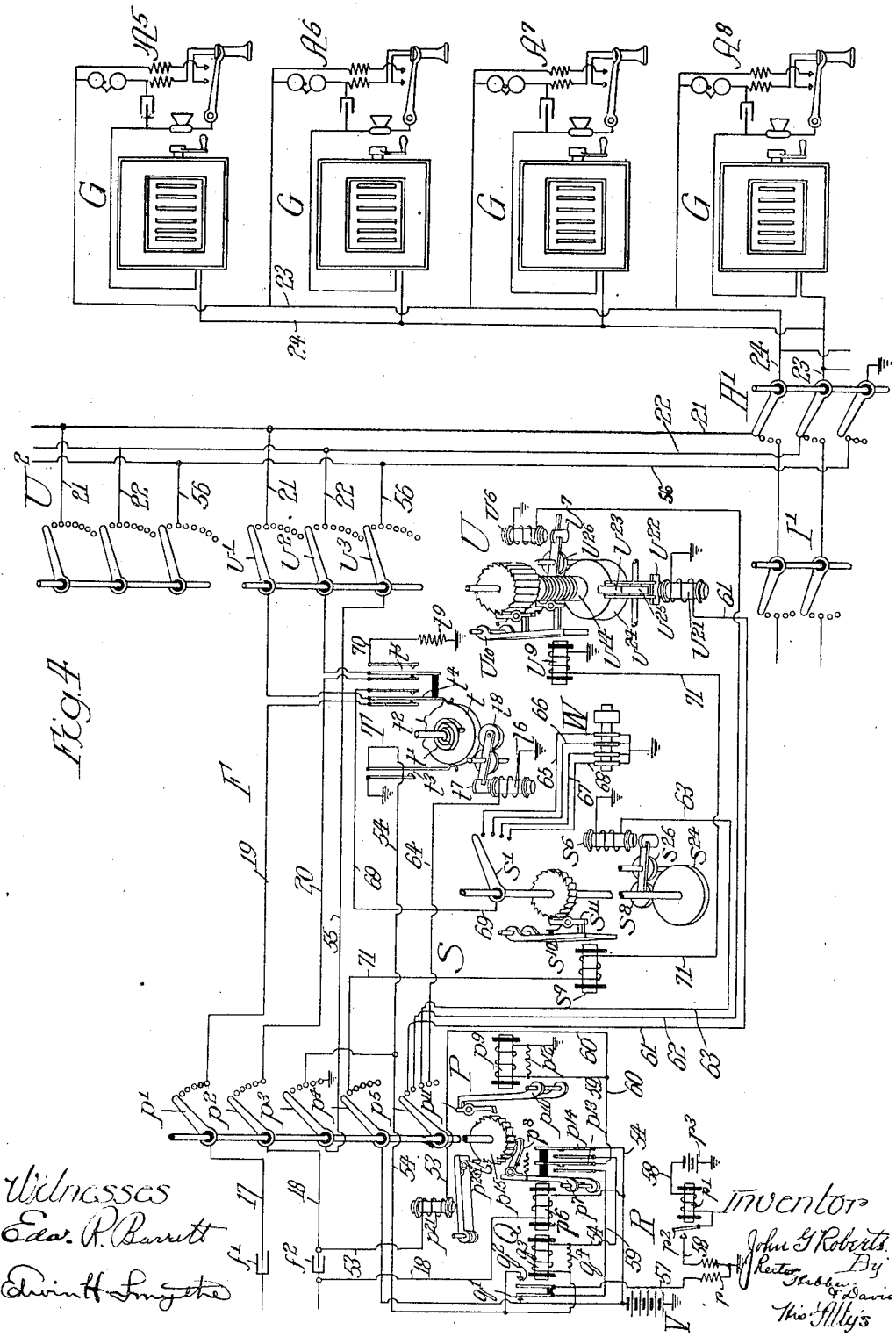

No. 875,951. PATENTED JAN. 7, 1908.
J. G. ROBERTS.
CONTROLLING MECHANISM FOR AUTOMATIC EXCHANGES.
APPLICATION FILED JULY 10, 1906.
11 SHEETS—SHEET 3.

No. 875,951. PATENTED JAN. 7, 1908.
J. G. ROBERTS.
CONTROLLING MECHANISM FOR AUTOMATIC EXCHANGES.
APPLICATION FILED JULY 10, 1906.

11 SHEETS—SHEET 4.

No. 875,951. PATENTED JAN. 7, 1908.
J. G. ROBERTS.
CONTROLLING MECHANISM FOR AUTOMATIC EXCHANGES.
APPLICATION FILED JULY 10, 1906.
11 SHEETS—SHEET 7.

Witnesses
Inventor
John G. Roberts.

No. 875,951.
PATENTED JAN. 7, 1908.
J. G. ROBERTS.
CONTROLLING MECHANISM FOR AUTOMATIC EXCHANGES.
APPLICATION FILED JULY 10, 1906.
11 SHEETS—SHEET 8.
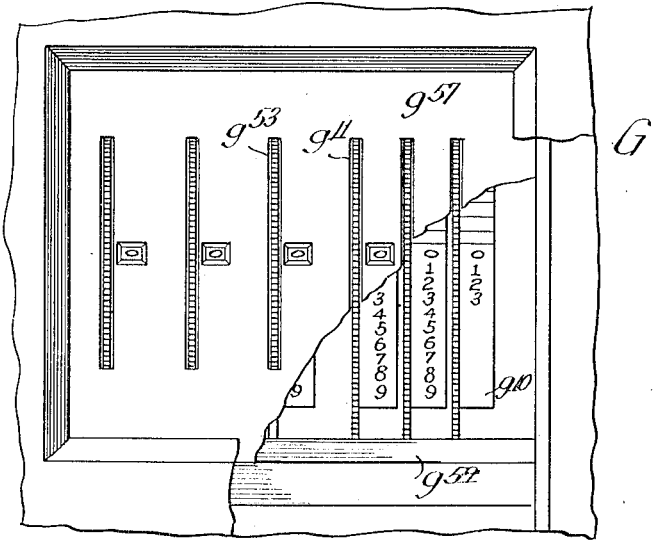
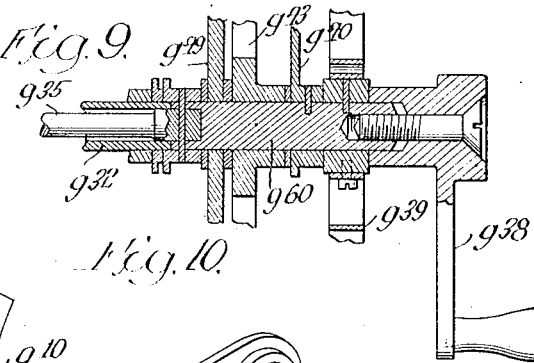
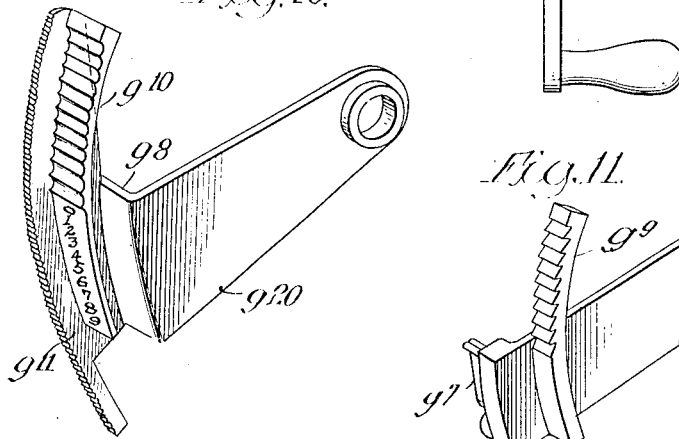
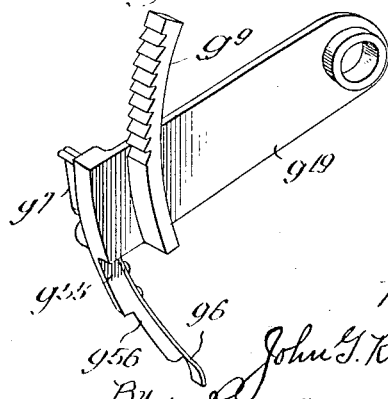
Witnesses:
Edw. P. Barrett
Edwin H. Smythe
Inventor
John G. Roberts.
By Rector, Hibben & Davis, his attys.

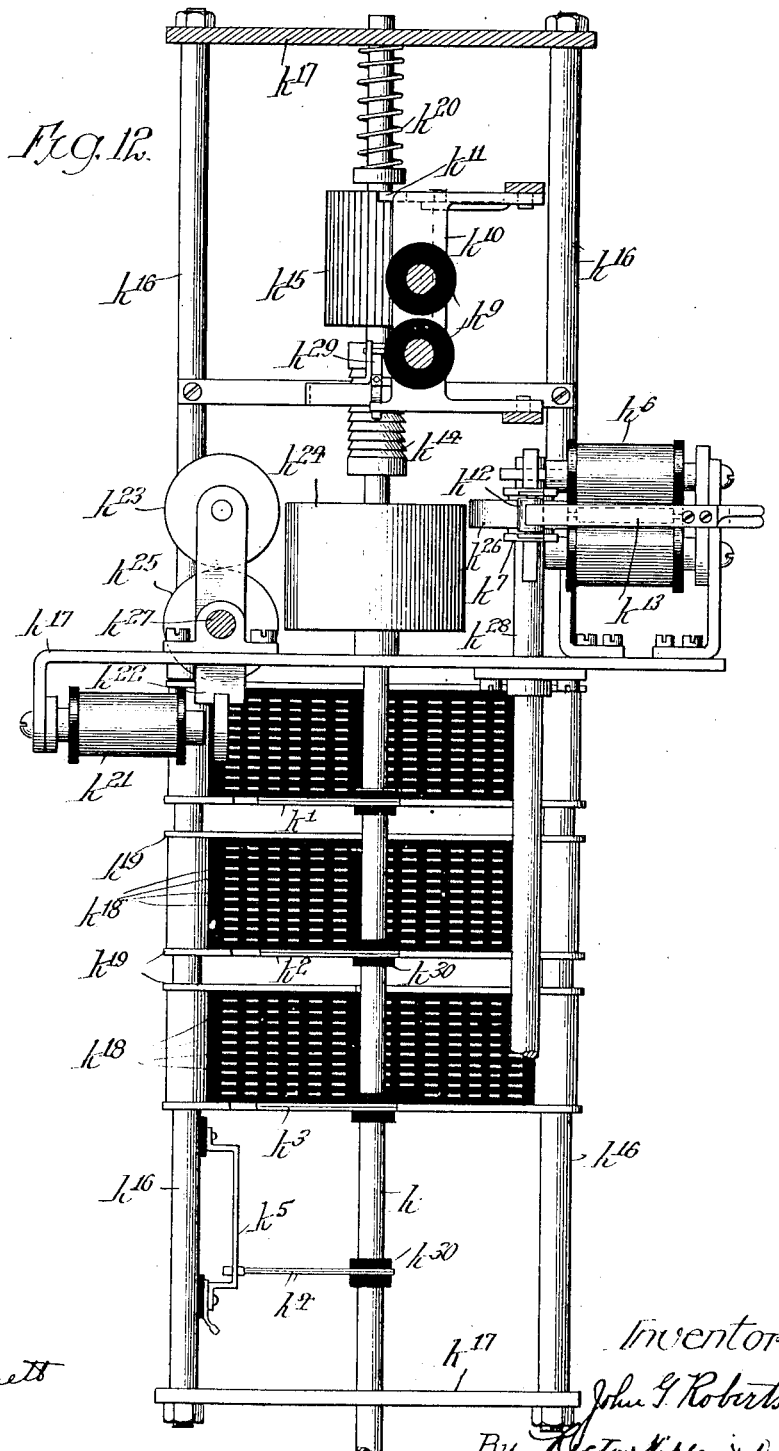

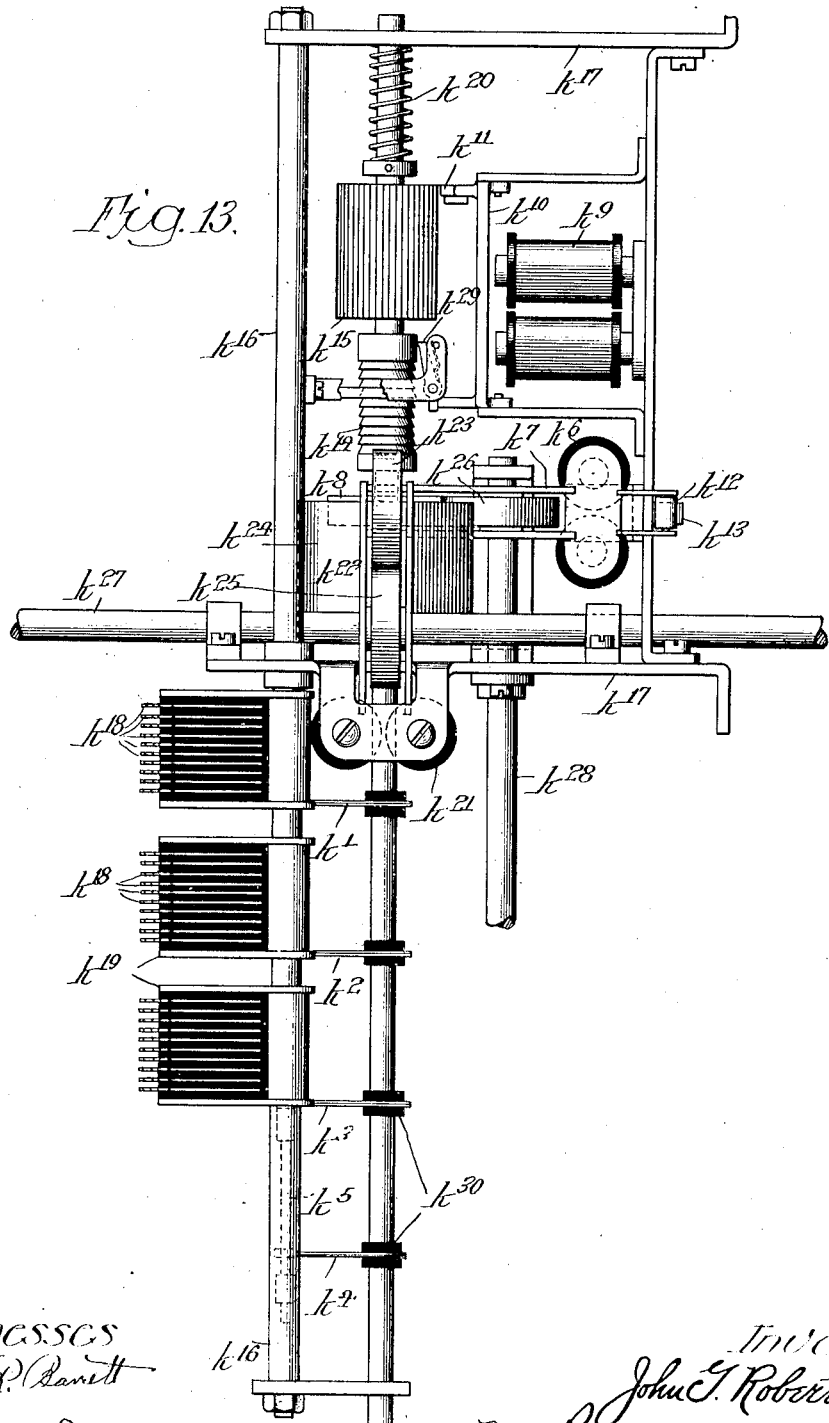

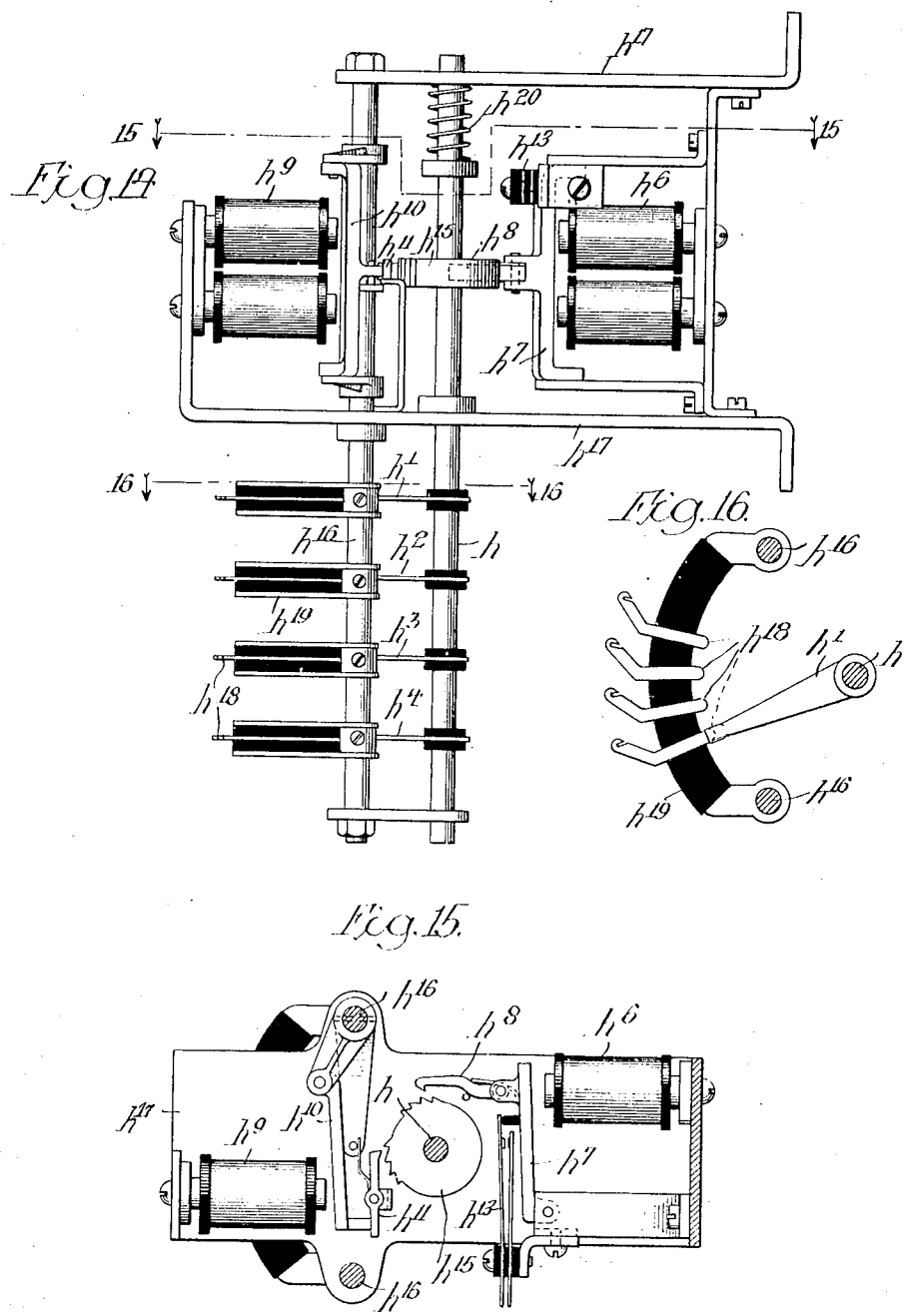

UNITED STATES PATENT OFFICE.

JOHN G. ROBERTS, OF CHICAGO, ILLINOIS, ASSIGNOR TO WESTERN ELECTRIC COMPANY, OF CHICAGO, ILLINOIS, A CORPORATION OF ILLINOIS.

CONTROLLING MECHANISM FOR AUTOMATIC EXCHANGES.

No. 875,951.	Specification of Letters Patent.	Patented Jan. 7, 1908.

Application filed July 10, 1906. Serial No. 325,454.

*To all whom it may concern:*

Be it known that I, JOHN G. ROBERTS, a citizen of the United States, residing at Chicago, in the county of Cook and State of Illinois, have invented certain new and useful Improvements in Controlling Mechanism for Automatic Exchanges, of which the following is a specification.

My invention relates to switch mechanism for controlling a system of circuits designed for use in an automatic telephone exchange wherein the operation of connecting two telephone lines for the purpose of intercommunication is performed through the medium of mechanism operating automatically, without the intervention of an operator; and its principal object is to provide controlling mechanism that will produce the circuit changes required to bring about the operation of the automatic interconnecting devices with the highest possible degree of accuracy, efficiency and speed, while requiring the minimum of exertion in the manipulation of the controlling device mechanism. In the accomplishment of this object I have produced a circuit controlling device intended primarily for use at the subscriber's station of an automatic telephone line, and particularly adapted for employment in an automatic telephone exchange system such as that described herein, the novel features of which are claimed in my co-pending application Serial No. 305,272, filed March 10, 1906, of which the present application is a division. It will be understood, however, that the controlling device particularly described and claimed in this application is capable of use in systems other than that in connection with which it is illustrated and described in the present instance, and that the invention is therefore not to be restricted to the particular combinations here shown.

The controlling mechanism of my invention is particularly designed for employment in connection with an automatic telephone exchange system capable of accommodating and providing for the interconnection of a very large number of telephone lines, which may be either party lines or individual lines, and in which system the several stations on a line may have their call signals or bells selectively actuated from the central office. It is also designed to control the mechanisms at the central office involved in establishing connection with other lines, and in transmitting the various signals incident to such interconnection, without requiring the provision of the customary earth connection or common return conductor, or having recourse to the use of more than two conductors between the substation, or group of substations, and the central office.

In the system in which I prefer to employ my invention I so organize the connecting and controlling mechanism at the central office that its selective operation is effected by means of electrical impulses transmitted from the substations over a single circuit, the controlling or impulse transmitting mechanism at the substation being adapted to impart to the currents sent over the line certain peculiar characteristics to which the mechanism at the central office is selectively responsive. In this system the mechanism thus selectively operated by the impulses determined by the controlling mechanism serves, upon the initiation of a call at any one of the substations, to prevent any intrusion upon the calling line on the part of any other line by disconnecting the circuit through which connection is completed to the calling line, and at the same time establishing a peculiar electrical condition on the terminals of the line through which connection with it is completed, thus indicating that the line is engaged. It serves to find, in succession, trunks that are not in use extending through the groups of ten thousands, thousands, hundreds, and tens to the particular line with which the calling line is to be connected, and, having selected the line, it serves to test its free or busy condition. If the selected line is engaged, the mechanism responds to the peculiar electrical condition existing upon its terminals, and transmits a tone or other distinctive signal to the calling subscriber to indicate that the called line is busy; if the line is not engaged, the mechanism is actuated through the agency of the controlling device at the calling substation to select the ringing current to which the station wanted is adapted to respond, and to apply this particular current to the line. It serves, after the ringing current has been applied to the called line a certain number of times without any response from the called substation, automatically to disconnect the ringing current, and to apply a tone or a characteristic signal to the calling line to indicate that the called subscriber does not answer. If, on the other hand, the subscriber responds to the calling signal, the mechanism operates automatically to disconnect the ringing current from the line, and to complete the communication circuit between the called and the calling lines; and, finally, it serves, upon the hanging up of the telephone of the calling substation at the end of the conversation, to bring about an automatic restoration of the normal condition of the connecting and selecting circuits and apparatus.

To effect the selective actuation of the central office mechanism through the medium of a single circuit extending between the substation and the central office, and having no earth connection at the substation, I so construct the circuit controlling device at the substation that it is adapted to modify the flow of current in the circuit, and produce a series of impulses, each impulse having a certain predetermined duration. The length or duration of any of the impulses may be varied by varying the relation to each other of parts of the controlling device provided for that purpose; and the duration of each impulse determines the operation of a certain part of the automatic mechanism at the central office. The organization of this mechanism is such that each impulse of current in the circuit controls the movement of one of the switches concerned in the selecting of the called line and its interconnection with the calling line, and the extent of movement of each switch is dependent upon the duration of the particular current impulse to which it is adapted to respond. This result I attain by associating with each switch a constantly and uniformly moving part, which is brought into operative relation with the movable member of the switch at the beginning of the current impulse, and which remains in operative relation with it until the impulse ends, the switch member being held in the position to which it has been advanced by suitable electrically controlled retaining mechanism.

In connection with the switches that are selectively responsive to the duration of the impulses, I provide other switches which, so to speak, distribute the impulses of the series each to its corresponding selecting switch, the distributing switch being selectively responsive to the number of impulses, and not to their duration. I prefer to arrange these distributing, or controlling, switches so that each will respond to certain consecutive impulses in the series, and not to the others, the switches having a step-by-step movement, one step for each of the impulses to which they are responsive, and being retained in the position to which they are advanced in the last step by suitable electrically controlled mechanism. I am thus enabled, by providing a controlling device at the substation adapted to produce in the circuit of the line a certain number of impulses of current, each impulse having a certain predetermined duration variable at will, to effect any desired selective actuation of the series of electrically operated switches at the central office which are involved in the selection of the called line, its interconnection with the calling line, and in the transmission to both the calling and the called lines of the appropriate signals.

Figure 5:
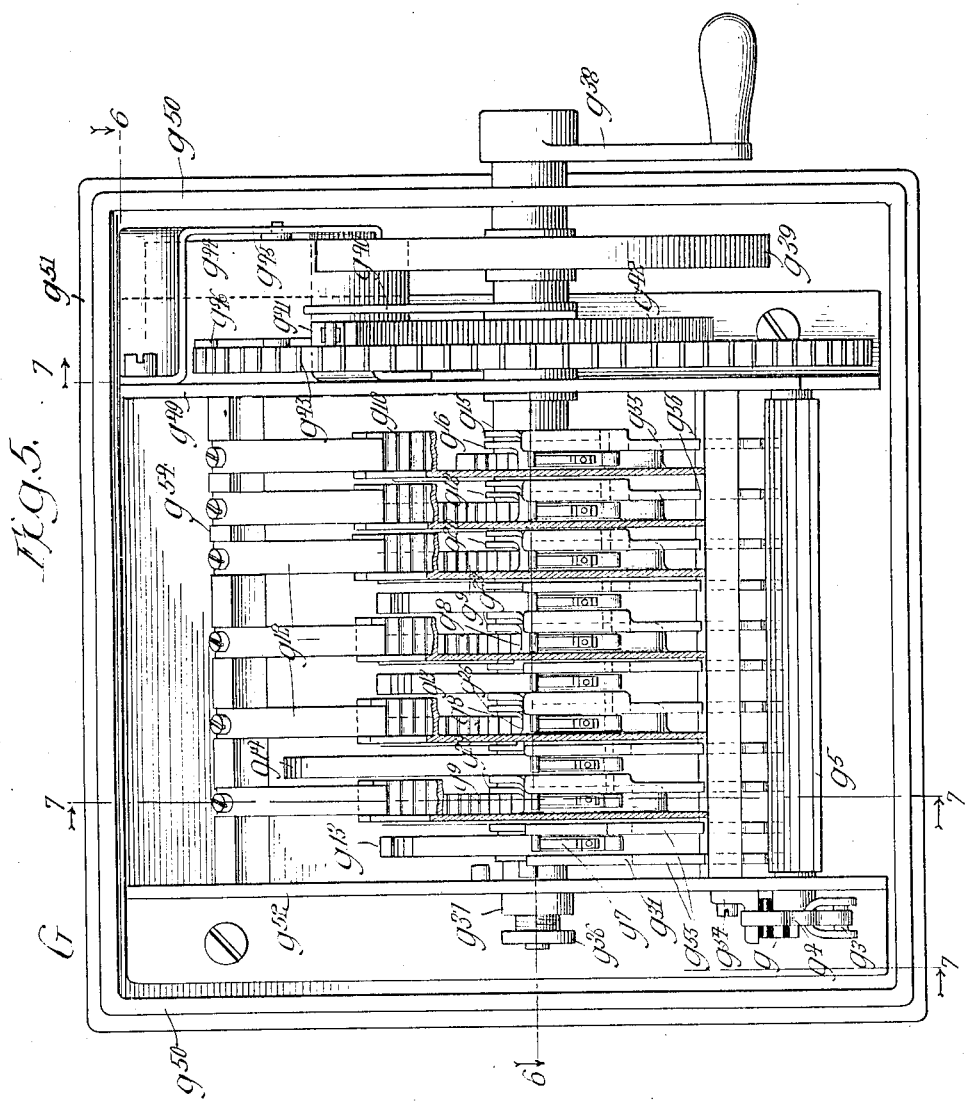
Figure 6:
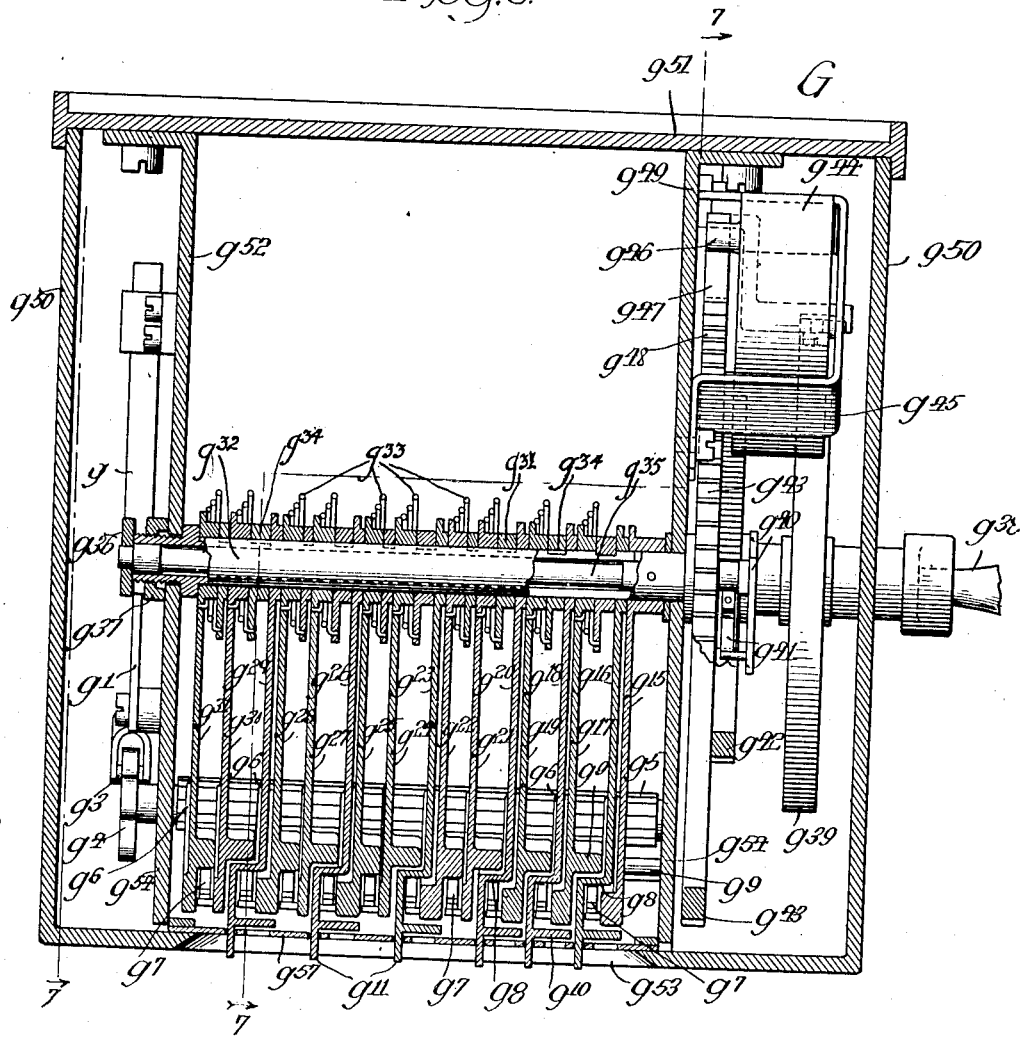
Figure 7:
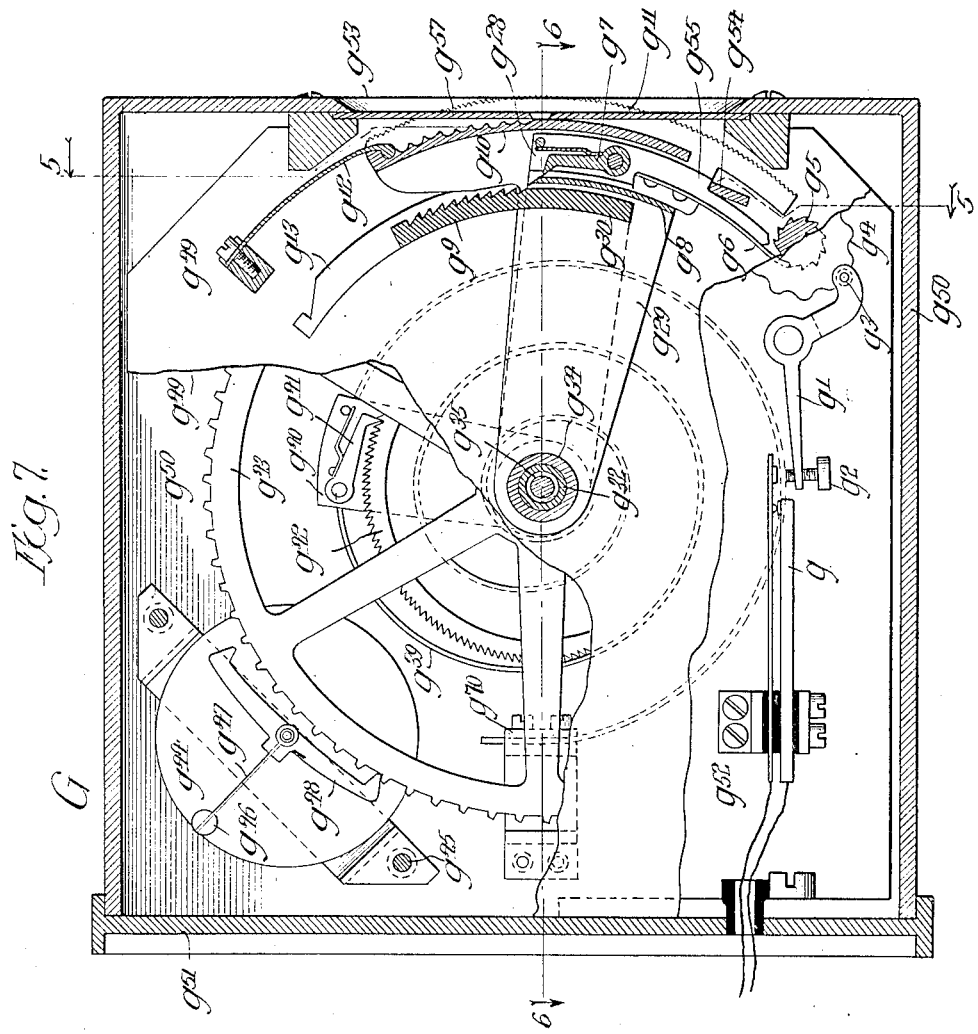

I will describe my invention in connection with the accompanying drawings, wherein Figures 1, 2, 3 and 4 taken together constitute a diagrammatic representation of the circuit which is involved in establishing connection between a calling and a called subscriber's line in an automatic telephone exchange equipped for use with my invention, and designed to accommodate up to one hundred thousand lines; Fig. 5, a front elevation, partially in section on line 5—5 of Fig. 7, of the substation interrupter or circuit controlling device; Fig. 6, a sectional view of the same on lines 6—6 of Figs. 5 and 7; Fig 7 an end elevation of the interrupter partially broken away and in section on lines 7—7 of Figs. 5 and 6; Fig. 8, a front elevation of the outside of the interrupter with part of the inclosing shell broken away; Figs. 9, 10 and 11, detail views of parts of the interrupter; Fig. 12, a front elevation of one of the selecting switches arranged for actuation by magnetically controlled constantly-moving mechanism; Fig. 13 a side elevation of the same; Fig. 14, an elevation of one of the controlling or distributing switches; Fig. 15, a sectional plan view of the same on line 15—15 of Fig. 14; and Fig. 16, a detail view of one set of the connection terminals of the switch.

I shall first describe the mechanism concerned in the production of the current impulses in the circuit of the line and the determination of the duration or length of each impulse. This mechanism I have designed with the particular object of meeting the requirements of the system with which in the present instance it is shown associated; but it will be understood that its form may be considerably varied—as, for instance, to adapt it for use in association with other circuit arrangements—without departing from the broad spirit of my invention.

The substation interrupter, or controlling device, which I find it convenient in the present instance to employ, is illustrated in Figs. 5 through 11, and is designated by the reference character G. It comprises essentially a switch $g$, or circuit controlling device, with mechanism for causing it to open and close its contacts a predetermined number of times, and to vary at will the length of time between interruptions. The switch and its controlling mechanism are supported on a frame consisting, in the present instance, of the base $g^{51}$ from which project the partitions or flanges $g^{49}$ and $g^{52}$ over which an inclosing shell $g^{50}$ is placed to inclose and protect the mechanism mounted within. The frame and shell may be metal, or of any suitable material. The switch $g$ comprises a stationary part or anvil and a movable switch spring which normally rests upon the anvil, the spring having a projecting portion which is adapted to be engaged by an adjusting screw $g^2$ carried on the end of a bell crank lever $g^1$ pivoted to the flange $g^{52}$ of the frame on which the switch is mounted, the other end of the bell crank lever carrying a part $g^3$, preferably in the form of a roller, which is adapted to be engaged by a disk $g^4$ having a periphery provided with alternate elevations and depressions, so that as the disk is rotated the lever $g^1$ is oscillated to alternately open and close the contacts of the switch $g$. The disk $g^4$ is carried upon the end of an elongated ratchet wheel $g^5$ journaled at its ends in the flanges $g^{49}$ and $g^{52}$ of the frame. The ratchet with its associated disk, whose alternate elevations and depressions correspond with the teeth of the ratchet, is turned step by step by a series of actuating members distributed along the length of the ratchet, and each adapted to cause the advance of the ratchet through one step. These actuating parts, in the present instance, are eleven in number, and are designated $g^{15}$, $g^{17}$, $g^{19}$, $g^{21}$, $g^{22}$, $g^{24}$, $g^{25}$, $g^{27}$, $g^{28}$, $g^{30}$ and $g^{31}$. The general construction of the actuating parts is plainly shown in Fig. 11. Each part is, in the present instance, in the form of an arm journaled at one end upon a sleeve $g^{32}$ which extends between the flanges of the frame approximately along the center of the device, and at the other end carries a downwardly projecting segmental arm $g^{55}$ provided with a spring finger $g^6$ adapted to engage a tooth of the ratchet $g^5$ to advance it, (the flexibility of the spring finger keeping it from interfering with the advance of the ratchet by the other actuating members), and with a shoulder $g^{56}$ which is designed to engage a stop bar $g^{54}$ extending transversely across the frame, to limit the downward movement of the actuating part and prevent it from advancing the ratchet wheel more than one step. Each arm also carries a ratchet portion, preferably extending upward from the arm on the arc of a circle concentric with the shaft or sleeve upon which the arm is journaled, and having as many teeth as may be required. In the present instance, $g^{19}$, $g^{21}$, $g^{24}$, $g^{27}$ and $g^{30}$ are each provided with ten teeth as shown in Fig. 11, $g^{17}$ with four teeth, $g^{22}$, $g^{25}$ and $g^{28}$ each with but one tooth, while $g^{15}$, the last member in the series, has no teeth. Each arm also bears a pawl $g^7$, preferably on the side of the arm away from the ratchet, adapted to engage and coöperate with the teeth of the ratchet carried on the adjoining arm.

Between certain of the actuating arms shielding members of the character illustrated in Fig. 10 are interposed. Each of these members comprises an arm fulcrumed at one end of the sleeve $g^{32}$, upon which the actuating members are fulcrumed, and provided at the other end with a portion $g^8$ adapted to be interposed between the pawl of one actuating member and the ratchet portion of the next actuating member in the series. This shielding portion $g^8$ may conveniently be formed, as shown, by bending the arm laterally at right angles to its plane, the forward portion of the arm being again bent forwardly into a plane parallel with that of the rear portion of the arm and carrying a segmental enlargement $g^{11}$, provided with a knurled edge adapted to project through a corresponding slot in the plate $g^{57}$ in the front of the interrupter. Projecting laterally from the segment $g^{11}$ of the shielding member is a portion $g^{10}$ on an arc having its center in the axis of the sleeve on which the member is journaled, and provided on its lower portion with numerals or suitable characters brought into view one at a time through a corresponding aperture in the front plate $g^{57}$ to indicate the extent of displacement of the arm about its shaft, and on the upper portion with corrugations corresponding in number and separation with the number and separation of the characters on the lower part of the lateral projection, and designed to coöperate with a retaining finger $g^{12}$ to hold the shielding arm in any position to which it may be moved by means of its projecting knurled edge. Each shielding arm is also provided with a part adapted to engage the stop bar $g^{54}$ to limit the downward movement of the arm. Mounted upon the shaft or sleeve $g^{32}$ adjacent to each of the actuating arms, and secured to the sleeve so as not to be rotatable thereon, is a collar $g^{34}$ which serves as an abutment for a spiral spring $g^{33}$ the other end of which is secured to the actuating arm, and which serves to return the arm to its normal resting position against the stop bar $g^{54}$ after it has been displaced therefrom. No retracting springs are provided for the shielding members, which are adapted to remain in the position to which they are manually moved.

In the arrangement as described the operation of the switch $g$ is effected by the return of the actuating members to their normal resting positions, one after the other, after having been displaced therefrom. To provide for their displacement, and their return to normal position at a uniform and invariable rate of speed, I provide the following mechanism: Through the hollow shaft or sleeve $g^{32}$ there extends a shaft $g^{35}$, which terminates at one end in a screw-threaded portion upon which is a nut $g^{36}$ extending over the end of the sleeve $g^{32}$ to prevent the longitudinal displacement of the shaft in the sleeve, and at the other end is provided with an enlarged portion or head pinned to an extension shaft $g^{60}$, which is journaled in the flange $g^{49}$ of the frame, and to the end of which a handle $g^{38}$ is secured. The hub of the first actuating arm, $g^{15}$, of the series is rigidly secured to the enlarged portion of the shaft to rotate therewith, while the hubs of the other actuating and shielding arms are, as has heretofore been stated, loosely mounted on the sleeve $g^{32}$ so as to be capable of rotation thereon. The sleeve $g^{32}$ is supported at one end by a screw-threaded portion of reduced diameter which passes through the flange $g^{52}$ and is secured thereto by means of a nut, as shown, and at the other end by its engagement with the enlarged end of the shaft $g^{35}$, which is rotatable within it. To provide for the restoration of the shaft and its associated parts after they have been turned from their normal position by means of the handle $g^{38}$, I employ, in the present instance, a spiral spring $g^{39}$ one end of which is suitably secured to the enlarged end of the extension shaft $g^{60}$, while the other end is made fast to an abutment $g^{70}$ mounted upon the frame; and in order that the restoration of the shaft from its displaced to its normal position may be at a uniform and invariable rate of speed, I employ a heavy balance wheel $g^{44}$ and escapement mechanism comprising an escapement $q^{48}$ suitably fulcrumed, and connected with the balance wheel by means of a spring $g^{47}$ secured to an abutment $g^{46}$ on the wheel, together with an escapement wheel $g^{43}$ journaled upon the extension shaft $g^{60}$. By means of a ratchet wheel, $g^{42}$ rigidly secured to the escapement wheel and adapted to be engaged by a pawl $g^{41}$ carried on an arm $g^{40}$ rigidly secured to the extension shaft $g^{60}$, I bring about the result that the movement of the shaft $g^{35}$ is under the control of the escapement mechanism only in the return movement of the shaft, the pawl on arm $g^{40}$ acting to couple the arm with the escapement wheel only in the return movement of the arm. The balance wheel is made of such relatively large mass, and the spring which connects it with the escapement is so proportioned that the movement of the escapement wheel, and the shaft which it controls, is slow and at a practically uniform rate of speed. The balance wheel, as shown, is journaled between a bridging support $g^{45}$ and the flange $g^{49}$ of the frame.

As has been stated, the hub of the actuating arm $g^{15}$, the first in the series, is rigidly secured to the shaft $g^{36}$, and it is through this arm that movement is imparted to the other arms in the series in the operation of the device. When the handle $g^{38}$ is turned to cause the rotation of the shaft, the arm $g^{15}$ is caused to rotate, and the pawl $g^{7}$ carried at the end of the arm is brought into engagement with one of the teeth of the ratchet portion of the next actuating arm in the series, the tooth engaged depending on to what extent the shield of the intervening shielding member of arm $g^{16}$ is interposed between the pawl and the ratchet with which it coöperates. As soon as the pawl of $G^{15}$ and the ratchet of $g^{17}$ engage, the movement of the shaft is imparted to $g^{17}$ which, in turn, causes its pawl to come into engagement with the ratchet of the succeeding actuating member, and so on down the line. It will be obvious that the extent to which any one of the actuating members will be moved before movement is imparted to the next member or arm in the series will depend entirely upon the extent of interposition of the shield of the intervening shielding member between the pawl of one and the ratchet of the other; and that therefore the interval of time which will elapse between the return to its normal position of one actuating member and the return to its normal position of the preceding actuating member of the series in the return movement of the mechanism, and hence the interval between actuations of the switch $g$, may be predetermined by moving the intervening shielding member through any predetermined arc.

It will be noted that certain of the actuating members, namely, $g^{22}$, $g^{25}$, $g^{28}$ and $g^{31}$, are provided with only one tooth with which the pawl of the preceding member of the series can engage, and that no shielding member is interposed between either of them and the preceding actuating member. This is because the operation of the automatic mechanism which the device under description controls does not require at these points in the sequence of impulses an impulse of variable duration, and therefore it is sufficient to provide for a current impulse of any certain fixed duration by employing but one tooth, and locating it so as to insure a fixed and constant movement of the preceding member before movement is imparted to this member. The function of the shields at the points in the series where they are located is, so to speak, merely to provide means for effacing or rendering inoperative all of the teeth but the first one with which engagement is permitted, and, by being made movable in their relation to the teeth of the associated ratchet, to make the position of the operative tooth variable at will.

When, in the use of the interrupter described above, a call is to be made for a particular line in the exchange, the position of each of the shielding arms is adjusted by means of its knurled edge, which projects through the corresponding slot in the face plate of the device, so as to cause the numbers or characters which appear at the apertures in the face plate, reading from left to right, to correspond with the number of the station with which connection is desired. When this is done, each shield is so interposed between its associated members as to produce certain time intervals between the starting of their respective movements when the handle is turned to set the device, and between the ending of their movements when the members are allowed to return to their normal positions. Actuating member $g^{15}$ is the first to be moved from its resting position, and member $g^{31}$ the last; and in the return movement $g^{31}$ is the first to return to its home position and $g^{15}$ the last, each member in succession as it returns to its home position turning the ratchet $g^5$ one step, and through the medium of the disk $g^4$ and the lever $g^1$, causing the switch $g$ to open and close its circuit. This succession of makes and breaks in the circuit which the switch $g$ controls following each other at predetermined intervals, varying according to the operative relation of the actuating members to each other, effects the selective actuation of the central office mechanism in a manner hereinafter to be described. The shields, it will be observed, remain in the positions in which they are set, thus enabling the call to be repeated without the necessity of again setting up the number; while the actuating members are moved back to their normal positions each by means of its associated spring $g^{33}$ which has been put under tension in the setting movement of the handle, the return movement of the shaft merely serving through the medium of the interconnected series of members to retard their return movement and regulate the same to a constant and uniform speed.

I will now describe the switch which I have designed to respond selectively to the duration of the current impulses determined by the substation interrupting mechanism, such as that just described. One form of switch which I find it convenient to employ, is illustrated in Figs. 12 and 13. So far as the switch mechanism proper is concerned it does not differ greatly from that employed in a well known automatic telephone exchange system, and which is illustrated and described in Patent No. 638,249, issued December 5, 1899 to Keith & Erickson, the principal feature of difference being in the organization which I have provided for effecting and controlling the movement of the movable switch members. The switch comprises, in the present instance, a frame consisting of two parallel rods $k^{16}$ and transverse plates $k^{17}$ upon which are mounted the movable and stationary switch contact members and the mechanism for operating them. The movable members $k^1$, $k^2$, $k^3$, and $k^4$ are rigidly secured to a rod $k$, from which they are insulated by insulating sleeves $k^{30}$. Associated with each of the movable members $k^1$, $k^2$, and $k^3$ are a number of stationary contact members $k^{18}$, which may be arranged in banks of ten rows, fourteen contacts in a row, or in any other grouping which the character of the circuits which are to be controlled requires. As shown, the lower movable contact member $k^4$ is arranged to engage but a single contact piece $k^5$. As is customary in a switch of this character, the movable members are adapted to be brought into contact with any one of the fixed or stationary contact members by two movements, one vertical, and the other horizontal, the vertical movement being first caused to bring the movable member opposite a particular row of contacts with one of which the connection is to be made, and the rotary movement causing the arm to sweep over the contacts in that row until it completes connection with the one desired. It has been customary to effect this movement of the movable members of the switch by means of two electro magnets operating through the medium of step-by-step mechanism, one to raise the shaft or rod $k$ step by step the desired distance, and the other to rotate it step by step until the desired fixed contact is engaged. In accordance with my invention I employ, instead of this step-by-step mechanism, constantly moving parts magnetically moved into engagement with a part associated with the rod $k$ to effect the vertical movement and the horizontal movement of the rod. The driven part, or part associated with the rod, is shown in the present instance as cylinder $k^{24}$ which is adapted to be engaged by two constantly rotating disks $k^{23}$ and $k^8$, the first mentioned disk being adapted, when it is moved into contact with the driven cylinder $k^{23}$ to cause the shaft or rod $k$ with its associated switch members to move up, while the disk $k^8$, when moved into contact with the driven cylinder, is adapted to impart to the rod and its associated switch arms a movement of rotation. The disks $k^{23}$ and $k^8$ are similarly arranged, both being fulcrumed in the end of levers $k^{22}$, $k^7$, respectively, and both being in engagement with constantly rotating disks $k^{25}$, $k^{26}$, respectively, carried upon shafts $k^{27}$, $k^{28}$, respectively, which are constantly and uniformly driven by any suitable source of power. The levers $k^{22}$, $k^7$, respectively, are fulcrumed upon, or concentric with, their associated shafts $k^{27}$ and $k^{28}$, and each carries, in the present instance on the end opposite the end which carries the disk, an armature which is in operative relation with electro-magnets $k^{21}$ and $k^6$, respectively, suitably mounted upon the frame of the switch. The magnet $k^6$ also serves, in the present instance, to actuate through the medium of its armature a switch $k^{13}$, with which a roller $k^{12}$, or like part carried upon the end of the armature, is adapted to be brought into engagement when the magnet is energized. In order to effect the appropriate movement of the movable switch members, the mechanism actuated by the magnet $k^{21}$ is mounted so that disk $k^{23}$ rotates in a vertical plane just out of contact with the driven cylinder $k^{24}$; while the mechanism actuated by magnet $k^6$ is so arranged that the disk $k^8$ rotates in a horizontal plane just out of contact with the driven cylinder. The driving disks are normally held in their retracted positions by any suitable means.

With the rod or shaft $k$ of the switch I associate a retracting spring $k^{20}$, which serves to return the switch members to their normal resting position; and, to prevent such return excepting at proper time, I provide magnetically controlled retaining mechanism, comprising a vertical retaining ratchet $k^{14}$, a horizontal retaining ratchet $k^{15}$, and a magnet $k^9$, the armature $k^{10}$ of which coöperates with two pawls $k^{11}$ and $k^{29}$, the first of which is adapted to engage the teeth of the horizontal retaining ratchet $k^{15}$, and the latter the teeth of the vertical retaining ratchet $k^{14}$ when the magnet is energized. Upon the deënergization of the magnet the armature operates upon the pawls $k^{11}$ and $k^{29}$ to cause them to release their associated ratchets, whereupon the shaft $k$ with its movable switch members is free to return to its normal position. The vertical retaining ratchet $k^{14}$ is made in the form of a cylinder around the circumference of which the teeth extend, so that the pawl which engages the teeth does not prevent the rotation of the shaft $k$ after it has been raised the required distance; and likewise the horizontal retaining ratchet $k^{15}$ is in the form of a cylinder with the teeth extending longitudinally thereof, to permit the vertical movement of the shaft while preventing its horizontal rotary movement.

In the operation of the switch, an impulse of current is caused to pass through magnet $k^{21}$, which responds by attracting its armature and bringing disk $k^{23}$ into contact with the driven cylinder $k^{24}$. As the disk is constantly rotated, it immediately causes an upward movement of the cylinder, and, as the speed of rotation is maintained uniform at all times, the extent of the upward movement is exactly determined by the length of time during which the impulse of current passes through the magnet. When the current ceases the constantly rotating disk $k^{23}$ is immediately withdrawn from the cylinder, and the shaft is held in the position to which it has been moved by the engagement of retaining pawl $k^{29}$ with the ratchet $k^{14}$. The operation of the controlling mechanism thereupon causes an impulse of current to traverse the coils of magnet $k^6$ which, responding, moves the constantly rotating disk $k^8$ into contact with the driven cylinder and thus imparts to the shaft $k$ and its associated switch members a movement of rotation. This movement takes place at a uniform rate, and ceases immediately upon the cessation of the current flow in the magnet $k^6$, the extent of movement thus depending upon the duration of the current impulse. The shaft is held in the position to which it has been rotated by the engagement of pawl $k^{11}$ with ratchet $k^{15}$, and the switch held at the point to which it has been advanced, as long as current, which was imparted to magnet $k^9$ before the operation of magnets $k^{21}$ and $k^6$, continues to flow through retaining magnet $k^9$. When this current ceases, the pawls release the ratchets and the switch parts return to their normal positions. It will be observed that movable contact arm $k^4$ remains in engagement with its associated contact part $k^5$ during the vertical upward movement of the shaft, and is withdrawn therefrom at the outset of the movement of rotation of the arm.

In Figs. 14, 15 and 16 is illustrated another form of switch which I find it convenient to employ. This switch does not differ greatly from types well known in the art, and does not require extended description. It comprises a frame $h^{17}$ arranged to be secured to any suitable support, and upon which the parts of the device are mounted. The movable contact members of the switch $h^1$, $h^2$, $h^3$ and $h^4$ are mounted upon, but insulated from, a rod or shaft $h$ fulcrumed in the support, and provided with a spring $h^{20}$ for returning it to its normal position when it is moved therefrom. Each movable switch member coöperates with a series of stationary or fixed contact terminals $h^{18}$, being adapted to complete connection with one after the other of the contacts as it is swung about the rotation of the rod. Movement is imparted to the rod and the associated switch members by means of an electromagnet $h^6$ through the medium of a pawl $h^8$ carried upon the armature $h^7$ of the magnet, and coöperating with a ratchet $h^{15}$ mounted, in the present instance, upon the upper part of the rod. The switch arms are maintained in the position to which they have been moved by means of a retaining pawl $h^{11}$ normally held away from the ratchet $h^{15}$ by the engagement therewith of the armature $h^{10}$ of another magnet $h^9$, the retaining pawl being allowed to come in contact with the ratchet when the magnet $h^9$ is energized to attract its armature. To render the mechanism incapable of advancing the movable switch members beyond the last stationary terminal each is adapted to engage, and hence irresponsive to all but a predetermined number of the current impulses that traverse the magnet $h^6$, I provide the ratchet wheel $h^{15}$ with only as many teeth each for the advancing pawl and the retaining pawl as correspond with the advanced positions which the movable members are adapted to occupy. Any further actuation of the magnet $h^6$ is thus ineffective to cause a further advance of the switch arms. The magnet $h^6$ is also arranged to operate a switch $h^{13}$ the members of which are suitably mounted upon but insulated from the frame, the arrangement being such that the switch maintains its contacts open so long as the armature is retracted, and closes them when the magnet is energized. The switch shown associated with the magnet $h^6$, in the present instance, comprises only two contact members; but any other number and combination of contact members may be substituted as the circuit or circuits to be controlled require. Likewise, although the present switch is illustrated as being provided with four movable contact members each adapted to coöperate with four fixed or stationary contact terminals, it will be understood that any other combination of movable and fixed members may be provided as desired.

I shall now describe the circuits by means of which the mechanism described in the foregoing, together with other apparatus which is well known and requires no detailed description, is combined in an organization which the circuit changing device of my invention is adapted to control. The circuit organization is illustrated diagrammatically in Figs. 1, 2, 3, and 4 of the drawings, which illustrate two telephone lines, each provided with a plurality of substations, together with the series of circuits which would be required to link them together for conversation assuming that they were in an automatic telephone exchange adapted to serve up to one hundred thousand lines. The various controlling and interconnecting switches are diagrammatically indicated, and will be recognized as being similar to or of the type of the switches described in the foregoing portion of the specification. For the sake of simplicity in illustration, many parts of the mechanism which are not essential to the understanding of the circuit connections are omitted, including all excepting part of one horizontal row of stationary contacts in each bank of the switches adapted for both vertical and horizontal movement; and for the same reason a number of batteries and earth connections are shown at different points in the figures, whereas it will be understood that these batteries might be, and in most cases would be, one and the same battery adapted to supply current for the operation of the entire system, while the connections illustrated as being to earth might be to a single common return conductor.

The scheme for effecting interconnection between any two lines in the exchange which is followed in the present instance may be briefly stated as follows: Each subscriber's line is terminated upon the movable members of a switch which are adapted in one position to extend the line to a coöperating switch through the medium of which any particular line may be selected in case of a call outgoing from the line in question, and which are adapted in another position to connect the line with stationary contact terminals of other switches through which connection is completed with the line in case of a call incoming to it. The movable contact terminals of the coöperating switch associated with each line are adapted to complete connection with any trunk which is not busy of a number terminating upon the stationary or fixed terminals of the switch. This trunk extends to the movable terminals of another automatic switch which may have ten rows of fixed terminals, representing the ten groups of ten thousand lines each into which the exchange may be divided, and as many contacts in each row as there are trunk lines extending from this switch to the group of ten thousand. By causing the movable contacts of the switch to move vertically a predetermined distance, any particular group of ten thousand may be selected, and, in the horizontal movement of the switch which follows, any of the trunks extending to this group which is not busy is appropriated. The trunk thus found terminates at its other end upon the movable contacts of a switch whose ten rows represent the ten groups of one thousand lines each into which the lines of the larger group are divided, while the contacts in each row represent the number of trunks extending from this switch to the particular thousand lines represented by the row. The predetermined vertical movement of the movable members of this switch selects the particular thousand group desired, and the horizontal movement finds a trunk which is not busy and completes connection with it. The other end of the trunk found terminates upon the movable members of a switch whose ten rows of fixed contacts represent ten groups of a hundred each into which the group of one thousand lines is divided, and whose contacts in each row represent the trunks extending to this particular hundred. In like manner, the vertical movement of the movable members of the switch selects the particular hundred desired, while the horizontal movement finds a free trunk extending to this hundred and makes connection therewith. The other end of the trunk thus selected extends to the movable members of the switch which serves to complete connection with the particular line called, the ten rows of contacts representing the ten groups of ten into which the hundred is divided, and the ten contacts in each row being connected with the ten individual lines which that row represents. The vertical movement of the movable member selects the proper ten's group, and the horizontal movement selects and completes connection with the line desired.

I have designated the four substations of the calling line $A^1$, $A^2$, $A^3$ and $A^4$, and the four substations of the called line, $A^5$, $A^6$, $A^7$, and $A^8$. Each substation is provided with the usual telephonic apparatus, comprising in the present instance the call bell $a$, a condenser $a^1$, an induction coil $a^2$, a transmitter $a^3$, a telephone receiver $a^4$ and a switch hook $a^5$; and in addition there is provided at each substation an interrupter or circuit controller G of the type hereinbefore described, or of any form which will perform the work of this interrupter. The telephone line extends from the four substations $A^1$, $A^2$, $A^3$ and $A^4$ in two limbs 1 and 2 to the movable terminals of a controlling switch H at the central office B, while the telephone line which serves substations $A^5$, $A^6$, $A^7$ and $A^8$ extends in two limbs 23 and 24 to the movable terminals of controlling switch $H^1$ at the central office designated F. An extension of the telephone line 1, 2 connects with the fixed or stationary contact terminals of a number of connecting switches $U^1$, subject, however, to the control of switch H, while the limbs 23, 24 of the other telephone line extend to the fixed contact terminals of a number of connecting switches $U^2$, subject to the control of switch $H^1$. Each line entering the exchange has, in the present instance, a normal connection with the poles of a central battery V, one of the limbs of the line including the magnet which serves to actuate the controlling switch on the movable members of which the line terminates. To avoid confusion, this arrangement is not illustrated in the case of the line extending from the substations $A^5$, $A^6$, $A^7$, and $A^8$ to the central office; but in the case of the line extending from substations $A^1$, $A^2$, $A^3$, and $A^4$, the magnet $h^6$ is shown included between limb 2 of the line and the free pole the battery V. To provide a return path for the current which flows to the line through magnet $h^6$, and at the same time to balance the line against inductive disturbances, an inductance or retardation coil $b$ is connected between the limb 1 of the line and the other or grounded pole of the battery.

The switch H, as shown, is provided with four movable contact arms $h^1$, $h^2$, $h^3$, and $h^4$, mounted on but insulated from the shaft $h$ the rotation of which is controlled by the magnet $h^6$; and, as shown, each arm is adapted normally to rest on one and to be brought into contact with three other stationary contact terminals. The first two stationary contacts of each series engaged by contact arms $h^1$ and $h^2$ of the switch are connected with conductors 25 and 26 extending to the stationary contact terminals which represent the line terminating on switch H on the various connecting switches $U^1$. In their third position the arms $h^1$, $h^2$, rest on dead or disconnected terminals and in their fourth position extend the circuit of the conductors 1 and 2 of the line to conductors 3 and 4 which are connected with contact arms $i^1$ and $i^2$ of the associated finder switch I. The arm $h^3$, which is connected to earth, or the earthed pole of the battery, completes no circuit in its normal or resting position, but in its second, third and fourth positions grounds conductor 27, which is connected on switches $U^1$ to the stationary terminals associated with conductors 25 and 26, and which serves as a test conductor to indicate, by its changed electrical condition when the switch H is operated, that the line 1, 2 is engaged. The arm $h^4$ of the switch is connected with the free pole of the central battery V and completes no circuit either in its first, or normal, or in its second position; but in its third and fourth positions closes a conductor 28 which extends through the actuating magnet $i^6$ of the associated finder switch I, and thence to earth or the other pole of the battery by way of the resting contact of arm $i^4$ of that switch, and which also has a branch 29 extending to earth through the winding of the retaining magnet $i^9$ of the switch I.

The winding of retaining magnet $h^9$ is included in a conductor 33 extending between the poles of the battery, and controlled by contacts $h^{13}$ of the actuating magnet $h^6$ of the switch, the circuit being closed to energize the retaining magnet to allow the pawl $h^{11}$ to engage the ratchet $h^{15}$ when current flows through the winding of the magnet $h^6$. It is necessary that the pawl $h^{11}$ shall be in engagement with the ratchet to retain the switch in its advanced position while the armature $h^7$ of the magnet $h^6$ is being moved back and forth by the impulses in the line circuit to advance the switch; and in order that the pawl may not be released during the brief intervals when the armature $h^7$ is unattracted, and conductor 33 therefore opened at contact $h^{13}$, I preferably make the magnet $h^9$ sluggish in its action by shunting its winding with a resistance $h^{12}$ which serves to take the discharge of the magnet and cause current to continue circulate in the local circuit during the momentary interruption of conductor 33. Any interruption of the circuit longer than the momentary one which occurs as the armature of magnet $h^6$ moves back and forth in causing the step-by-step advance of the switch arms, permits the deënergization of magnet $h^8$, thus making the retaining pawl inoperative and permitting the switch to return to its normal position. It will be understood that this result may be obtained, and the relatively sluggish operation of retaining pawl $h^{11}$ be effected in a number of other ways well known in the art.

Referring now more particularly to the finder switch I, which is associated with controlling switch H and is individual to the line 1, 2 extending to substations A¹, A², A³ and A⁴, this switch is structurally practically the same as the switch illustrated in Figs. 12 and 13 of the drawings and hereinbefore described, excepting that it has but a single row of stationary contacts for each movable switch arm, and therefore is enabled to dispense with the mechanism for effecting a vertical movement of the switch arms. This switch has four arms $i^1$, $i^2$, $i^3$ and $i^4$, the first two and the last of which, as has been previously stated, are connected to conductors 3 and 4 and to earth, respectively, while arm $i^3$ is normally connected by way of conductor 30 to earth through the resting contacts of the switch $i^{13}$ operated by the actuating magnet of the switch I, and, in the alternative position of the switch, to the portion of conductor 28 extending between the actuating magnet $i^6$ and the resting contact of arm $i^4$. The fixed terminals, with which arms $i^1$, $i^2$ and $i^3$ are adapted to come into engagement as they are rotated, are connected with the conductors of a number of trunk lines, the two line conductors 5, 6 of each trunk being terminated upon corresponding contacts of the series with which arms $i^1$ and $i^2$ coöperate while the local or test conductor 31 associated with each trunk is terminated upon a corresponding contact of the series which arm $i^3$ is adapted to engage. In the drawing but a single trunk 5, 6 is illustrated, with its conductors 5, 6 and 31 connected to other like finder switches I, but it will be understood that the other stationary contacts, of which there may be any desired number, of the switch I are all likewise connected to other trunks.

In the operation of the controlling switch H and the finder switch I described above, the closure of the telephone switch at any one of the four substations connected with line 1, 2 closes a circuit whereby current may flow steadily out through actuating magnet $h^6$ of switch H and back through the retardation coil $b$. This causes the actuating magnet to attract its armature and advance all of the arms of switch H one step, from their first or normal to their second position, which, it will be seen, does not interrupt the circuit normally existing between line 1, 2 and conductors 25, 26 extending to the connecting switches U¹, but merely serves to cause arm $h^3$ to connect conductor 27 to earth to make line 1, 2 "busy" to other lines. The first of the succession of current impulses determined in the line by the operation of interrupter G at the substation advances all of the arms of switch H to their third position and thereby disconnects conductors 25, 26 from the line, but does not affect the connection which has been established between conductor 27 and earth. The first impulse of the series also, in advancing arm $h^4$ to its third position, closes the circuit of conductor 28 and thereby brings about the energization of magnet $i^9$ of the finder switch I to allow the retaining pawl to engage the ratchet; and also causes actuating magnet $i^6$ to attract its armature and thus bring the constantly rotating disk $i^8$ into contact with the driven disk $i^{24}$ of the switch. The shaft $i$ of switch I thereupon starts to rotate, causing the contact arms to sweep over the fixed contact members upon which the various trunks 5, 6 terminate. In the first stage of the movement of the switch arms, arm $i^4$ breaks the earth connection of conductor 28 in which the winding of actuating magnet $i^6$ is included; but the actuating magnet, in moving the rotating disk $i^8$ into contact with the driven disk to cause the rotation of the switch, also operates switch $i^{13}$ causing the switch spring to open its normal and close its alternative contact, which completes a circuit for actuating magnet $i^6$ through conductor 30 to the arm $i^3$ of the switch. This arm in the movement of the switch is swept over the contacts upon which the local or test conductors 31 of the various trunks terminate, and as, as will hereinafter be described, these conductors are grounded when the trunks with which they are associated are busy, the actuating circuit for magnet $i^6$ will be completed and the rotation of the switch arms will continue so long as the arm $i^3$ is moving over terminals representing trunks that are busy. But as soon as it passes onto the contact of a trunk which is free, it finds no circuit for the current flowing through actuating magnet $i^6$, and that magnet is deënergized and permits the constantly rotating disk $i^8$ to be disengaged from the driven disk, the switch arms being maintained in the position to which they have been moved by retaining pawl $i^{11}$. As soon as the actuating magnet is deënergized, the spring of switch $i^{13}$ returns to its normal resting contact and thereby applies a ground to conductor 30, thus grounding the test contacts of the trunk with which connection has been made at all the switches to which the trunk is multiplied, and preventing the trunk from being appropriated by any other switch. The second impulse of current determined by the substation interrupter now occurs, and advances all of the arms of switch H to their fourth and last position, causing arms $h^1$ and $h^2$ to extend the circuit of line 1, 2 to conductors 3, 4, which have just been connected to trunk conductors 5, 6 by switch I. The advance of arms $h^3$ and $h^4$ to their fourth position does not effect any change in the circuits which they control, the conductor 27 remaining grounded to keep the "busy" test condition on the associated terminals of the switches U¹ and the circuit of conductor 28 remaining grounded to maintain energized the retaining magnet of switch I, thus holding the switch arms in the position to which they have been moved. Subsequent impulses determined by interrupter G and transmitted over the circuit, do not cause any further change in the position of switch H on account of the mechanical inability of the actuating magnet to advance the ratchet mechanism more than three steps.

The trunk line 5, 6 with which the line 1, 2 is connected at B through the medium of the switches H and I, extends to another group comprising a controlling switch J and a finder switch K located at the point in the sequence marked C. The controlling switch J of this group is structurally identical with the controlling switch H described above, excepting that it has an extra set of contacts $h^{14}$ controlled by the armature of the actuating magnet. Inasmuch as the other parts of the switch correspond in all respects with like parts of switch H, I have designated them by the same reference characters.

The construction of the finder switch K is illustrated in Figs. 12 and 13, and has been hereinbefore described; it differs from finder switch I in employing banks of stationary contacts to be engaged by each switch arms, instead of single rows, and vertical movement mechanism for enabling the arms to be brought into engagement with any row in a bank. In all respects other than those noted the construction of controlling switch J and finder switch K is similar to the construction of controlling switch H and finder switch I. However, owing to its location at a point in the circuit scheme where it would probably be necessary to extend the line to connecting apparatus at a distant office, as it is from this point that ten groups of trunks extending to ten groups of ten thousand subscribers' lines each ramify, it may be desirable to provide a greater number of contacts in the horizontal rows of switch K to accommodate a greater number of trunks in each group, so that greater flexibility of connection may be attained, and thus, on the whole, fewer trunks be required to serve the entire exchange. The conductors 5, 6 of the trunk line terminate upon arms $h^1$, $h^2$ of the switch J but are made discontinuous with respect to direct or steady currents flowing over the line by having condensers $c^1$, $c^2$ interposed in them. The actuating magnet $h^6$ of the controlling switch is connected in an extension of conductor 6 to the free pole of the battery V, the extension connecting with the conductor at a point between the condenser $c^2$ and the end of the line to which the calling substation is connected, so that it may be responsive to the impulses of current determined by the substation interrupter G. In order that the impulses may be relayed to the actuating magnets of the switches beyond this switch in the series, I provide a bridge 34 of the line between the condensers and the movable members $h^1$, $h^2$ of switch J, and control this bridge in the normally open contacts $h^{14}$ of the switch operated by the actuating magnet $h^6$; to prevent the shunting of voice currents across this bridge, I include therein a retardation coil $c$.

The stationary terminals with which the movable arms $h^1$, $h^2$ of the switch J are adapted to engage, are, as shown, four in number; but inasmuch as no circuit is completed by the arms until they have reached their fourth position, it will be obvious that all excepting the fourth contacts in the series might be dispensed with, so far as these two arms are concerned. The fourth contacts of the series are connected with conductors 7 and 8, respectively, which extend to arms $k^1$, $k^2$ of the finder switch K associated with controlling switch J. The movable arm $h^3$ of the controlling switch is arranged to control a normally open circuit 35 which includes the retaining magnet $k^9$ of finder switch K, the circuit being arranged to be maintained closed in the last three positions occupied by the arm $h^3$. Inasmuch as no change in the circuit conditions takes place while the arm $h^3$ is moving through its second, third and fourth positions, it is obvious that the same result might be accomplished by dispensing with the third and fourth stationary contacts, and so arranging the switch arm that it would remain on the second contact while the other arms were advancing to their third and fourth positions; or by arranging the arm to slide on a single contact which would extend over the space occupied by the three contacts. This may also be said of other parts of the mechanism of the various switches where no change of circuit is brought about during certain stages in the movement of the switch arms.

Arm $h^4$ is connected by way of conductor 36 with the free pole of the battery V, and is adapted in its second position to close the circuit of the vertical actuating magnet $k^{21}$ of the finder switch K by way of conductor 37; to open this circuit and complete one by way of conductor 38 through the horizontal actuating magnet $k^6$ in its third position; and in its final position to open the last mentioned circuit. The horizontal actuating magnet of finder switch K, as is the case in finder switch I, has its actuating circuit completed in a normally closed contact of the movable arm $k^4$ of the switch, the circuit through this path being opened at the outset of the rotary movement of the switch, and an alternative circuit being provided by way of conductor 39 to switch arm $k^3$ through the operation of the switch $k^{13}$ controlled by the armature of the horizontal actuating magnet $k^6$, the continued actuation of the magnet $k^6$ depending upon the "busy" condition of the trunks over the terminals of which arm $k^3$ sweeps in the movement of the switch. As was described in connection with switch I, when the arm $k^3$ moves into contact with the terminal of an idle trunk it finds no circuit for the current flowing through the horizontal actuating magnet $k^6$, which, becoming inert, stops the rotary movement of the switch arms, and at the same time, by permitting switch $k^{13}$ to resume its normal position, places an earth connection on the test terminal of the trunk with which connection is made by way of conductor 40 multiplied to all of the switches with which this trunk is connected, and thus prevents intrusion.

The operation of the switches J and K is substantially the same as that described in connection with switches H and I. The first impulse of current which reaches the actuating magnet $h^6$ of switch J is that which effected the last step of the movement of switch H. This impulse moves the arms of switch J to their second position, and in so doing closes the circuit 35 of retaining magnet $k^9$ of switch K and also closes the circuit of vertical actuating magnet $k^{21}$. The vertical movement of the arms, $k^1$, $k^2$, $k^3$ and $k^4$ thereupon commences, and continues as long as arm $h^4$ of switch J remains in its second position, which is determined by the duration of the current impulse. The next impulse of current, by opening the circuit of the vertical actuating magnet, ends the vertical movement and closes the circuit 38 of horizontal actuating magnet $k^6$, which remains closed until an idle trunk has been found, as heretofore described. This current impulse, as in the case of switch I and the other finder switches, is of sufficient duration to enable the arms to sweep over all of the stationary contacts in the row, in case it is necessary, and upon the next impulse the arms of switch J move to their fourth and final position completing connection between the trunk line 5, 6 and the conductors 7, 8 which has just been extended to the trunk 9, 10.

The circuit is illustrated as extending from the switches J and K at C by way of trunk line 9, 10 to a controlling switch L and a finder switch M at D, thence by way of trunk 13, 14 to a group comprising a controlling switch N and finder switch O at E, and finally by way of trunk 17, 18 to the connecting and signaling apparatus at F. The construction and operation of the switches L and M at D are exactly similar to the construction and operation of the switches J and K at C, excepting that as the trunk line 9, 10 is not made discontinuous at this point by the interposition of condensers, it is unnecessary to provide switch contacts and a circuit for relaying the impulses, which contacts are therefore omitted from controlling switch L; while a retardation coil $d$ is connected with limb 9 of the trunk to furnish a return path for the current which flows through the actuating magnet of the controlling switch. The construction of the switches and the circuit arrangement at E is similar to that at D, excepting that no retardation coil is connected with the line, the coil $d$ associated with controlling switch L at D also furnishing a return for the current which flows through the actuating magnet of controlling switch N.

The trunk 17, 18 selected by the switch at E extends to the movable arms $p^1$, $p^2$ of the controlling switch P at F, and includes in its limbs condensers $f^1$, $f^2$ to render it discontinuous to direct or steady currents flowing over the line. The controlling switch P in its construction and relation to the circuits which it controls is generally similar to the controlling switches heretofore described. In its construction it differs from them primarily in being provided with an additional actuating magnet $p^{21}$ and an additional switch arm $p^5$, and in being arranged to be advanced five steps instead of four. It comprises five switch arms $p^1$, $p^2$, $p^3$, $p^4$ and $p^5$ adapted to be advanced by means of actuating magnet $p^6$ acting on ratchet $p^{15}$ through the medium of armature $p^7$ and pawl $p^8$, and to be moved the final step in the advance by means of a second actuating magnet $p^{21}$ also acting on the ratchet through the medium of a pawl $p^{23}$, I have found it convenient to employ the actuating magnet $p^{21}$ in addition to magnet $p^6$, although the arrangement may be such that the final step in the advance is effected through the medium of actuating magnet $p^6$. The switch arms are held in the position to which they are moved by means of retaining pawl $p^{11}$ controlled by retaining magnet $p^9$ through the medium of armature $p^{10}$, the winding of the retaining magnet being shunted by the resistance $p^{12}$. Two switches $p^{13}$ and $p^{14}$ are provided, and arranged to be actuated by the armature of the actuating magnet $p^6$. The arms $p^1$, and $p^2$ of the switch govern the extension of the limbs of the trunk line 17, 18; the arm $p^5$ controls a selecting and connecting switch U, a ringing current selecting switch S, and an automatic ringing key T, all associated with the controlling switch and involved in the completion of connection with the called line; the arm $p^4$ controls the retaining magnets of the switches U and S; and the arm $p^3$ assists in the control of a circuit which determines the connection with the line of the tone producing apparatus R.

The tone producing apparatus R comprises, in the present instance, a suitable source of current $r^3$, having a circuit 58 which when completed extends through the winding and contacts $r^2$ of a relay $r^1$, and including one winding of an induction coil or transformer $r$, the other winding of which extends to a relay Q by means of which the tone may be applied to the line. The tone is produced by the making and breaking of the circuit 58 in the contacts of relay $r^1$, which produces by induction a rapidly alternating current flow in the other winding of the transformer $r$. The application of the tone to the line through the medium of relay Q is effected by mounting this relay in inductive relation to the actuating magnet $p^6$ of the switch P so that when the relay Q is actuated, under the conditions hereinafter to be described, the carrying current induced in the secondary of transformer $r$ will flow through the winding of relay Q, and thus induce a varying current in the winding of actuating magnet $p^6$, which is connected with the limb 18 of the line.

The connecting and selecting switch U corresponds structurally with the finder switches K, M and O previously described, excepting that it omits one of the movable switch arms, being provided with three instead of four, and also omits the switch $k^{13}$ controlled by the armature of the horizontal actuating magnet. This is because the circuit through its horizontal actuating magnet is not automatically controlled by the condition of the lines over which the terminals of one of the switch arms passes, but is under the sole control of the current impulses, and moves to and makes contact with a predetermined one of the fixed terminals in the row, whether the line associated with that terminal is busy or not. The selecting and connecting switch comprises the three movable arms $u^1$, $u^2$ and $u^3$ each adapted, as in the case of the other switches of this type heretofore described, to coöperate with ten rows of fixed or stationary terminals, there being in the case of the present switch ten contacts in each row. The arms are moved through the medium of the driven disk $u^{24}$ with which the vertical movement disk $u^{23}$ and a horizontal movement disk (not shown but positioned behind the portion $u^{14}$) are adapted to be brought into engagement when their respective armatures $u^{22}$ and $u^7$ are attracted by the magnets $u^{21}$ and $u^6$, respectively. The switches are maintained in the position to which they have been moved by the vertical and horizontal retaining pawls controlled by the retaining magnet $u^9$ through the medium of its armature $u^{10}$.

The ringing current selecting switch S is generally similar to the finder switch J. It has a single contact arm $s^1$ arranged to be swung over four stationary contact terminals, the arm having no vertical movement. The advance of the arm $s^1$ is effected through the agency of a disk $s^8$ in engagement with a constantly rotating disk $s^{26}$, and adapted to be brought into engagement with the driven disk $s^{24}$ of the switch through the agency of the actuating magnet $s^6$. The arm is held in the position to which it is moved by means of a retaining pawl $s^{11}$ controlled by the armature $s^{10}$ of retaining magnet $s^9$. The four fixed terminals with which the arm is adapted to be brought into engagement are connected through the medium of conductors 65, 66, 67 and 68 with four suitable sources of ringing current, as, for instance, the commutators of a generator W adapted to deliver alternating currents of a different periodicity from each commutator.

The construction of the switch T for controlling the application to the called line of the ringing current selected by switch S will, it is believed, be sufficiently clear from the diagrammatic representation which is shown. It comprises a disk $t$ rotatably mounted and having about its periphery a number of projections $t^2$ which are adapted in succession to engage and actuate the ringing switch, comprising the springs $t^4$, $t^5$ each moving between resting and alternate contacts, and also, at a certain stage in the operation of the disk, being adapted to actuate another switch $t^3$, consisting of a spring normally out of engagement with its coöperating contact. The rotation of the disk is effected by means of a constantly driven disk $t^8$ carried on an armature $t^7$ controlled by the actuating magnet $t^6$, a spring $t^1$ serving to retract the disk to its normal position when it is released by the driving disk $t^8$. It is obvious that other methods may be employed for controlling the actuation of the ringing key, the mechanism described in the present instance being merely illustrative of the scheme of operation.

The circuits for the above described mechanism are as follows: The energizing circuit for the actuating magnet $p^6$ of the switch P extends from the free pole of the central battery through the winding of the magnet to the limb 18 of the trunk line and thence over conductors 18, 16, 14, 12, 10 and 8 through the various switches which control these conductors back to the contacts $h^{14}$ of the controlling switch J at C, the return circuit being through bridging conductor 34 and retardation coil $c$ to the other pole of the battery through conductors 7 and 9 and retardation coil $d$ associated with controlling switch I. The energizing circuit 59 for the retaining magnet $p^9$ of this switch is controlled in contacts $p^{13}$ of the switch, as in the case of the other controlling switches, and also passes through the normally closed contacts $q^1$ of the tone controlling switch Q, to the free pole of the battery V. A branch 60 of conductor 59 extends to the arm $p^5$ of the switch, where it is adapted to be connected successively with conductors 61, 62, 63 and 64 extending to the grounded pole of the central battery through the vertical movement magnet $u^{21}$ of selecting and connecting switch U, the horizontal movement magnet $u^6$ of this switch, the actuating magnet $s^6$ of ringing current selecting switch S, and the actuating magnet $t^6$ of automatic ringing switch T, respectively. Another branch 53 of conductors 59 and 60 extends to the portion of conductor 18 connected with arm $p^2$ of the switch P, and includes the winding of magnet $p^{21}$, thus placing the magnet under the control of switch $p^{13}$. The arm $p^4$ of controlling switch P is connected with the free pole of the central battery, and is adapted when moved from its normal position to complete a circuit 71 extending through the retaining magnets $s^9$ and $u^9$ of switches S and U, respectively. Arm $p^3$ of the switch is connected by means of conductor 55 to the arm $u^3$ of the connecting switch U by means of which it is adapted to be brought successively into contact with the third or test conductors 56 of the various telephone lines connected with the stationary terminals of this switch. The stationary contact which arm $p^3$ is adapted to engage in its fourth position, is connected through the medium of conductor 54 to the free pole of the battery V by way of the winding $q^3$ of tone controlling relay Q and switch $p^{14}$ of actuating magnet $p^6$. The stationary contacts which the arm $p^3$ engages in its last two positions are connected to earth, so that the conductor 56 of the line upon which arm $u^3$ rests when connection is completed is grounded and thus caused to test "busy."

The arms $p^1$ and $p^2$, as previously stated, are connected through the medium of condensers $f^1$, $f^2$, with limbs 17 and 18 of the trunk line extending from the switch at E, and are adapted in their final position to extend the trunk line to conductors 19 and 20, which are connected to the arms $u^1$, $u^2$ of switch U through the normal or resting contacts of the switch $t^5$ of automatic ringing key T. The spring $t^4$ of this switch which is connected with arm $u^1$, is adapted in its alternative position to complete connection with the arm $s^1$ of switch S by way of conductor 69, and thus apply to arm $u^1$, and thus to limb 21 of the called line, ringing current of the character determined by the position which arm $s^1$ occupies. Spring $t^5$ of the ringing switch, which is connected with arm $u^2$, is adapted in its alternative position to connect the arm, and through it limb 22 of the called line, to earth or the common return conductor through a resistance $t^9$. The switch $t^3$ associated with the automatic ringing key T controls a branch to ground of circuit 54 which includes the magnet of tone switch Q, and is adapted to be actuated to complete this branch after the ringing switch has been operated to apply ringing current to the called line a predetermined number of times,—illustrated in the present instance as three times, although this may be varied as desired.

The various switches and mechanisms located at F coöperate as follows: Upon the first impulse of current relayed over the trunk line 17, 18 by switch $h^{14}$ of controlling switch J, the arms of switch P are advanced one step, arm $p^4$ completing the circuit of retaining magnets $s^9$ and $u^9$ of switches S and U respectively, and arm $p^5$ starting the vertical movement of the selecting and connecting switch U through the medium of magnet $u^{21}$. Upon the next impulse, and the consequent advance of the arms of switch P to their third position, the vertical movement of the arm of switch U is stopped by the interruption of circuit 61, and the horizontal movement commenced by the completion of circuit 62 through magnet $u^6$, the circuit of the retaining magnets $s^9$ and $u^9$ remaining closed through this and the subsequent advance of the switch arms. Upon the next impulse, and the advancement of the switch arms to their fourth position, the horizontal movement of the arms of switch U is stopped by the interruption of circuit 62, and the arm $s^1$ of switch S started to select the particular ringing current to be applied to the line by the completion of circuit 63 through the magnet $s^6$. At the same time arm $p^3$ completes the circuit 54 of the tone controlling relay Q to arm $u^3$ of switch U, and, if conductor 56 connected with the stationary terminal upon which arm $u^3$ rests is grounded, causes the energization of the tone relay to apply the tone to the calling line to indicate that the called line is busy and also to open the circuits of conductors 59 and 60 to permit the deënergization of retaining magnet $p^9$ and the withdrawal of actuating current from arm $p^5$. If conductor 56 is not grounded, indicating that the called line is free for connection, the next impulse of current advances the arms of switch P to their fifth position thus interrupting circuit 63 and stopping the movement of switch arm $s^1$ of the ringing current selecting switch, and at the same time closing circuit 64 of the actuating magnet of automatic ringing key T, and completing connection between conductors 17, 18 and 55, and 19, 20 and ground respectively. The ringing key T thereupon operates to apply the ringing current selected by switch S to the called line. During this operation the called line is alternately connected with the source of ringing current and with actuating magnet $p^{21}$ of the switch P through the medium of conductors 20 and 53, so that when the circuit of the line is closed by the response of the called subscriber magnet $p^{21}$ attracts its armature and causes the advance of the switch arms P to their sixth or final position, thus opening the circuit 64 of the actuating magnet of ringing key T. If the actuating magnet $p^{21}$ is not energized to cause the switch arms to advance to their final position, the disk of ringing key T rotates until one of the projections on its periphery causes the closure of circuit 54 of the tone control ling relay Q in the contacts of switch $t^3$, whereupon relay Q is actuated to apply the tone to the calling line in the manner hereinbefore described, and, by opening circuit 59 in its contacts $q^1$ permits the armature of retaining magnet $p^9$ to fall back and release the pawl $p^{11}$.

The operation of the entire system may be summarized as follows: Assume that the subscriber at station $A^1$ associated with telephone line 1, 2 desires to obtain connection with station $A^7$ of line 23, 24, which we will assume is station No. 3 on line No. 56832. He will first set his substation interrupter G so that the numerals 56832 appear in the openings in the face plate of the device, reading from left to right. By doing this he so relates the adjustable actuating members of the interrupter to each other that the switch $g$ will be actuated, when the handle of the device is turned as far as it will go and then released, to produce impulses in the line circuit having durations as follows:

| Impulse. | Duration. |
| --- | --- |
| 1st | Sufficient for switch I to swing over horizontal terminals. |
| 2nd | Five units. |
| 3rd | Sufficient for switch K to swing over horizontal terminals. |
| 4th | Six units. |
| 5th | Sufficient for switch M to swing over horizontal terminals. |
| 6th | Eight units. |
| 7th | Sufficient for switch Q to swing over horizontal terminals. |
| 8th | Three units. |
| 9th | Two units. |
| 10th | Three units. |

Having set the interrupter he removes his telephone from the hook, thus closing the circuit of the line through the telephone apparatus and energizing actuating magnet $h^6$ of switch H to cause the advance of its arms to their second position, which causes the line to test "busy", by grounding test conductor 27, but does not interrupt its connection with conductors 25 and 26 incoming from the connecting switch $U^1$. He then turns the handle of the interrupter G as far as it will go and releases it, thus causing the actuating members to return to their home positions one by one and operate switch $g$ to interrupt the circuit of the line in the predetermined sequence, and produce impulses of the predetermined duration. At the outset of the first impulse the arms of switch H are advanced to their third position, disconnecting the line from incoming conductors 25 and 26, and starting the movement of finder switch I. The arms of this switch rotate until the circuit of the actuating magnet $i^6$ is opened by arm $i^3$ passing on to the terminal of a trunk line 5, 6 which is not engaged, when the movement of the arms is automatically stopped, as heretofore described. At the end of an interval sufficient to allow the arms of the finder switch I to traverse all of the stationary contact terminals if necessary, the first impulse is terminated, and upon the occurrence of the second impulse the arms of switch H are advanced to their final position, thus extending the circuit of the line through conductors 3 and 4 to the conductors 5, 6 of the trunk upon which the arms of switch I have stopped. This immediately completes the circuit through the actuating magnet of switch J at point C which advances its arms to their second position, and starts the vertical movement of switch K, this movement continuing during the five units of time to which the second impulse is limited. Upon the termination of the second impulse the vertical movement of switch K stops, and upon the third impulse, which immediately follows, the arms of switch J are advanced to their third position whereupon the horizontal movement of the arms of switch K commences this movement stopping automatically when an unengaged trunk line has been found, and before the termination of the impulse. Upon the passage of the fourth impulse the arms of switch J are advanced to their final position, extending the circuit of the line on by way of conductors 7 and 8 to the trunk 9, 10 which has been found by switch K, and, by the closure of the bridge 34 of the line in the switch contacts $h^{14}$ of controlling switch J, causing the energization of the actuating magnet of controlling switch L to advance its contact arms to their second position, thus closing the circuit of the vertical movement magnet of switch M. The vertical movement of this switch continues during the continuance of the fourth impulse, which has been noted as being equal to six units, and the switch arms have therefore been raised to the sixth row of contacts when the termination of the fourth and commencement of the fifth impulse cause the switch L to advance its arms to their third position and thus stop the vertical movement and start the horizontal movement of the switch M. This movement continues until an unengaged trunk is found, when it is automatically stopped, and, upon the occurrence of the sixth impulse, switch L advances its contact arms to their final position and extends the line on by way of conductors 11 and 12 to the selected trunk 13, 14, and starts the vertical movement of switch O through the agency of controlling switch N. The duration of the seventh impulse being eight units of time, the switch arms of switch O have been raised to the eighth row of stationary contacts when the vertical movement is stopped; and upon the occurrence of the seventh impulse the horizontal movement of switch O commences and continues until a free trunk is found, after which the eighth impulse advances the switch N to its final position and continues the circuit of the line by way of conductors 15 and 16 to conductors 17 and 18 of the selected trunk. The passage of the eighth impulse through the magnet of switch P causes the switch to move its arms to their second position, and thus starts the vertical movement of the connecting switch U, which is stopped at the end of three units of time leaving the arms opposite the third row of contacts. The ninth impulse advances the arms of switch P to their third position and starts the horizontal movement of the arms of switch U, which continues for the predetermined two units of time, at the end of which the tenth impulse causes them to come to rest upon the second terminal of the third row of each of the banks of contacts which they engage. The arms of the switch P are at the same time advanced to their fourth position, whereupon the arm of ringing current selecting switch S starts to move and continues during the three units of time which elapse until the termination of the tenth impulse, coming to rest at the end of the impulse on the third contact, which is connected with the commutator of the ringing current generator W adapted to produce current of the character required for actuating the third station $A^7$ of the line with which the connection is made.

The closure of the circuit which follows the termination of the tenth impulse advances the arms of switch P to their fifth position, and starts the automatic ringing key T, which causes the application of the ringing current selected to the called line for a predetermined number of times, as hereinbefore described, thus ringing the bell at substation $A^7$. When the subscriber responds by removing his telephone from the hook, the closure of the circuit causes actuating magnet $p^{21}$ of switch P to advance the arms of the switch to their final position, thus stopping the application of ringing current to the called line, and leaving the two lines connected for conversation. When the conversation is ended, the calling subscriber, by replacing his telephone on its hook, causes an interruption of the line circuit of sufficient duration to permit the armature of actuating magnet $h^6$ of switch H to fall back and open the circuit of retaining magnet $h'$, which allows the arms of the switch to turn back to their normal position, again rendering the line available for incoming connections over conductors 25 and 26, and taking the busy test off of conductor 27. The restoration of the arms of switch H to their normal position interrupts the circuit of the retaining magnet of the switch I, which returns to its normal position, and opens the circuit 5, 6 over which connection has been established between the calling and called subscribers' lines. The opening of this circuit acts, by permitting the release of the retaining pawls of the switches all along the line, to cause all the switches to return to their normal positions.

If, instead of being free, the called line is busy when the arms of switch U complete connection with it, the presence of a ground connection on the test conductors 56 associated with the line completes the circuit of the tone controlling relay Q through conductor 54, arm $p^3$ of the switch P, conductor 55 and arm $u^3$ of the switch U, causing it to attract its armature and apply the tone from the generating apparatus R to the calling line by the inductive action between magnet $q^3$ of switch Q and magnet $p^6$ of switch P, as heretofore described; the application of the tone continuing until the locking circuit through the magnet and contacts $q^2$ and relay Q has been interrupted by the opening of switch $p^{14}$, which occurs when the calling subscriber hangs up his telephone. If the called line is free, but the subscriber does not answer the call, after the ringing current has been applied for a predetermined number of times, three in the present instance, the circuit 54 of the tone relay Q is completed by the branch extending through contacts $t^3$ of the automatic ringing key T. This causes the application of the tone signal to the calling line in the same manner as when the called line is busy, the calling subscriber recognizing this as a "don't answer" signal on account of the greater time which elapses after the call before the signal is heard.

It will be observed that the connection of arm $p^5$ with the central battery is controlled in contacts $p^{13}$ of the actuating magnet $p^6$ of the switch; this is in order that the arm may be disconnected from battery during its return to its normal position after the switch has been released, so that momentary impulses of current may not be caused to flow to the various magnets in the circuit connected with the contacts which the arm $p^5$ traverses.

I claim:

1. Controlling mechanism for an automatic exchange, comprising a switch, a plurality of movable members associated therewith, said members being adapted to be displaced from their normal resting positions to different distances variable at will, means for causing said members to return to their normal positions, and mechanism for operating said switch actuated by each member upon its return.

2. Controlling mechanism for an automatic exchange, comprising a switch, a plurality of operatively connected movable members associated therewith and adapted to actuate said switch, and means associated with each of said members for varying at will its operative relation to the other members.

3. Controlling mechanism for an automatic exchange, comprising a switch, a plurality of movable actuating members for said switch, means for displacing said actuating members to different degrees variable at will, and mechanism actuated upon the return to its normal position of each of said members for operating said switch.

4. Controlling mechanism for an automatic exchange, comprising a switch, a series of movable actuating members therefor, said members being adapted to be displaced to different degrees, variable at will, from their normal positions, means adapted to effect the return of said members at a predetermined rate of speed, and mechanism made operative upon the return to its normal position of each of said members for actuating said switch.

5. Controlling mechanism for an automatic exchange, comprising a switch, mechanism adapted to be moved at a constant rate of speed, actuating members for said switch associated with said mechanism, and means for varying at will the relation of said members to said mechanism and each other to determine the actuation of said switch.

6. Controlling mechanism for an automatic exchange, comprising a switch, a part adapted to be moved at a constant and predetermined rate, means for moving the same, a series of actuating members interposed between said part and said switch, and means associated with each of said actuating members adapted to vary the relation of said member to the other members and to said part.

7. Controlling mechanism for an automatic exchange, comprising a switch, a series of movable actuating members therefor, each member being adapted to come into operative relation with said switch to actuate the same upon its return to its normal resting position, devices interposed between said members for connecting each member to its neighbor at a certain stage of its movement, means associated with each device adapted to determine the stage in the movement of its associated member at which it shall become operative, means for effecting the progressive displacement of said members, and means for causing their return to their normal position.

8. Controlling mechanism for an automatic exchange, comprising a switch, a series of movable members associated therewith, each of said members being provided with a part adapted to come into operative relation with said switch to actuate the same at a certain stage in the movement of said member, means for moving said members, and means associated with each member for controlling the movement of the next member in the series.

9. Controlling mechanism for an automatic exchange, comprising a switch, a series of movable members associated therewith, each of said members being adapted upon its return to its normal resting position to actuate said switch, a device carried by each of said members and coöperating with the next member in the series adapted to couple the two members together, a part associated with each of said coupling devices for rendering the same ineffective during a predetermined portion, variable at will, of the movement of its associated member, means for imparting movement to the first member of the series, said coupling devices serving to communicate the movement to the succeeding members, and means for effecting the return of said members to their normal resting positions at a uniform rate of speed.

10. Controlling mechanism for an automatic exchange, comprising a switch, a series of arms mounted side by side on a common shaft, and arranged for independent rotation thereon, a pawl and ratchet connection between each arm and its neighbor, means for positively rotating the first of said arms, rotation being imparted to the other arms in the series through the medium of said pawl and ratchet connections, spring operated means for effecting the return of said arms after they have been moved from their normal positions, a controlling device for regulating and rendering uniform the rate of said return movement, and mechanism rendered operative by each of said arms in its return to normal position for actuating said switch.

11. Controlling mechanism for an automatic exchange, comprising a switch, movable actuating members associated therewith, each of said members being adapted to actuate said switch upon its return to its normal resting position, a coupling device interposed between said members, means for imparting movement to one of said members, the coupling device acting to transmit the movement to the other member, means for effecting the return of said members to their normal position, and mechanism adapted to render said coupling device inoperative through a predetermined portion, variable at will, of the movement of one of said members.

12. Controlling mechanism for an automatic exchange, comprising a switch, two movable members associated with said switch and adapted to actuate the same upon their return to normal position, means for moving one of said members, a pawl mounted upon said member and adapted to engage a ratchet carried upon the other member to move said member, and adjustable means adapted to prevent any predetermined part of the movement of said pawl carrying member.

13. Controlling mechanism for an automatic exchange, comprising a switch, two movable members associated therewith, a coupling device interposed between said members, means for moving one of said members, a part adapted to render said coupling device inoperative during any predetermined part of the movement of said member, and means made operative by each of said members upon its return to normal position for actuating said switch.

14. Controlling mechanism for an automatic exchange, comprising a switch, a plurality of members each adapted to actuate the switch upon its return to normal position, means for moving said members from their normal positions, a device associated with each member adapted to regulate the amount of its displacement, and mechanism for returning said members to their normal position.

15. Controlling mechanism for an automatic exchange, comprising a switch, movable actuating members therefor, each of said members being adapted to actuate said switch upon its return to normal position, means for moving said members, devices interposed between said members for regulating their relative displacement, and means adapted to effect the return at a uniform rate of speed of said members from the positions to which they have been moved.

16. Controlling mechanism for an automatic exchange, comprising a switch, a plurality of parts adapted to actuate the same, means for moving the parts one after the other to operate the switch, and means adapted to be manually adjusted to regulate the operative relation of said parts to said moving means, whereby the time intervals between operation of the switch by the various parts is regulated.

17. Controlling mechanism for an automatic exchange, comprising a plurality of arms mounted for independent movement on a common shaft, a coupling device carried on each of said arms, an adjustable shield interposed between said device and the arm with which it is adapted to engage, means for moving said arms one after the other through the medium of said coupling devices, and switch mechanism actuated in the movement thereof.

18. Controlling mechanism for an automatic exchange, comprising a plurality of arms mounted for independent movement upon a common shaft, a pawl carried upon each arm the arm next in the series being provided with a ratchet surface with which said pawl is adapted to engage, an adjustable shield interposed between said pawl and the coöperating ratchet surface to prevent the engagement of the pawl therewith during a portion of the movement of said pawl carrying arm, said shield having a portion arranged for manual operation, means for moving said arms one after the other through the medium of said pawls and ratchets, and switch mechanism actuated in the movement of the arms.

19. Controlling mechanism for an automatic exchange, comprising a plurality of members movably mounted side by side, pawl and ratchet connections between said members, other members having parts adapted to be interposed to varying degrees between certain of said pawls and their corresponding ratchets, each of said last mentioned members being also provided with a projecting part by means of which the member may be moved, and with a surface bearing characters for indicating the extent of movement of the member, means for moving said first mentioned members one after the other through the medium of said pawl and ratchet connections, and switch mechanism actuated in the return movement thereof.

20. Controlling mechanism for an automatic exchange, comprising a switch, a toothed cylinder having a part adapted to operate said switch as the cylinder is rotated, movable members each having a part adapted in the return of said member to its normal position to engage a tooth of said cylinder to turn the same, means for displacing said members from their normal positions, and mechanism for causing them successively to return to their resting positions to operate the switch.

21. Controlling mechanism for automatic exchanges, comprising a switch, a plurality of movable members each adapted to actuate the same upon its return to normal position, means for progressively displacing said members to different degrees from their normal resting positions, spring means associated with each member for effecting its return after displacement, and a regulating device common to all said members adapted to control the rate of the return thereof.

22. Controlling mechanism for an automatic exchange, comprising a switch, a plurality of arms rotatably mounted side by side upon a common shaft, a spring associated with each of said arms adapted yieldingly to maintain it in a certain position, adjustable coupling mechanism interposed between adjacent arms, a device for rotating one of said arms to displace it from its normal position, the motion being transmitted through said coupling devices to the other arms in the series, spring means for effecting the return of said device after it has been moved to displace said arms, an escapement, and means adapted to connect said escapement with said device to regulate the rate of the return movement of said arms.

JOHN G. ROBERTS.

Witnesses:
 G. E. HIBBEN,
 LOUIS B. ERWIN.